US012762016B2

(12) United States Patent
Nguyen

(10) Patent No.: US 12,762,016 B2
(45) Date of Patent: Oct. 13, 2026

(54) DYNAMIC ERROR CORRECTION PROTECTION WITH RAIN PROTECTION FOR MEMORY SYSTEM

(71) Applicant: Micron Technology, Inc., Boise, ID (US)

(72) Inventor: Phong Sy Nguyen, Livermore, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/170,534

(22) Filed: Apr. 4, 2025

(65) Prior Publication Data

US 2026/0310552 A1 Oct. 8, 2026

(51) Int. Cl.
*G06F 11/00* (2006.01)
*G06F 11/10* (2006.01)

(52) U.S. Cl.
CPC ........ *G06F 11/108* (2013.01); *G06F 11/1096* (2013.01)

(58) Field of Classification Search
CPC ........................... G06F 11/108; G06F 11/1096
See application file for complete search history.

(56) References Cited

U.S. PATENT DOCUMENTS

| | | | | |
|---|---|---|---|---|
| 11,984,171 | B2 | 5/2024 | Fitzpatrick et al. | |
| 2015/0089325 | A1* | 3/2015 | Chandrasekhar | G11C 16/22 714/766 |
| 2019/0155686 | A1* | 5/2019 | Kumar | H03M 13/2927 |
| 2022/0050612 | A1* | 2/2022 | Luo | G06F 11/108 |
| 2022/0326858 | A1* | 10/2022 | Luo | G06F 3/0619 |
| 2023/0273745 | A1* | 8/2023 | Kulkarni | G06F 11/10 711/154 |
| 2024/0070021 | A1* | 2/2024 | Lien | G06F 11/1048 |
| 2024/0232011 | A1* | 7/2024 | Mulani | G06F 13/1673 |
| 2024/0289040 | A1* | 8/2024 | Athreya | G06F 3/0619 |
| 2025/0004877 | A1* | 1/2025 | Tan | G06F 11/108 |
| 2025/0053509 | A1* | 2/2025 | Bert | G06F 11/108 |
| 2025/0265011 | A1* | 8/2025 | Son | G06F 11/108 |

* cited by examiner

*Primary Examiner* — Joshua P Lottich
(74) *Attorney, Agent, or Firm* — Schwegman Lundberg & Woessner, P.A.

(57) ABSTRACT

Various example embodiments provide for dynamic error correction with redundant array of independent NAND-type memory devices (RAIN) protection for a memory system, such as a memory sub-system. In particular, various example embodiments provide one or more different solutions for implementing concurrent use of dynamic exclusively OR (dynamicXOR) protection and RAIN protection on a memory device while avoiding the challenges/conflicts suffered by conventional memory systems.

20 Claims, 10 Drawing Sheets

200

202 202 202

| | Plane 0 | | | |
|---|---|---|---|---|
| LP | 0 | 1 | 2 | 3 |
| UP | 4 | 5 | 6 | 7 |
| XP | 8 | 9 | 10 | 11 |
| TP | 12 | 13 | 14 | 15 |

204

202 202

FIG. 2

DYNAMIC ERROR CORRECTION PROTECTION WITH RAIN PROTECTION FOR MEMORY SYSTEM

TECHNICAL FIELD

Example embodiments of the disclosure relate generally to memory devices and, more specifically, to dynamic error correction protection with redundant array of independent NAND-type memory devices (RAIN) protection for a memory system, such as a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various example embodiments of the disclosure. The drawings, however, should not be taken to limit the disclosure to the specific example embodiments, but are for explanation and understanding only.

FIG. 2 is a diagram illustrating an example stripe that can be used in connection with various example embodiments of the present disclosure.

DETAILED DESCRIPTION

Figure 1:
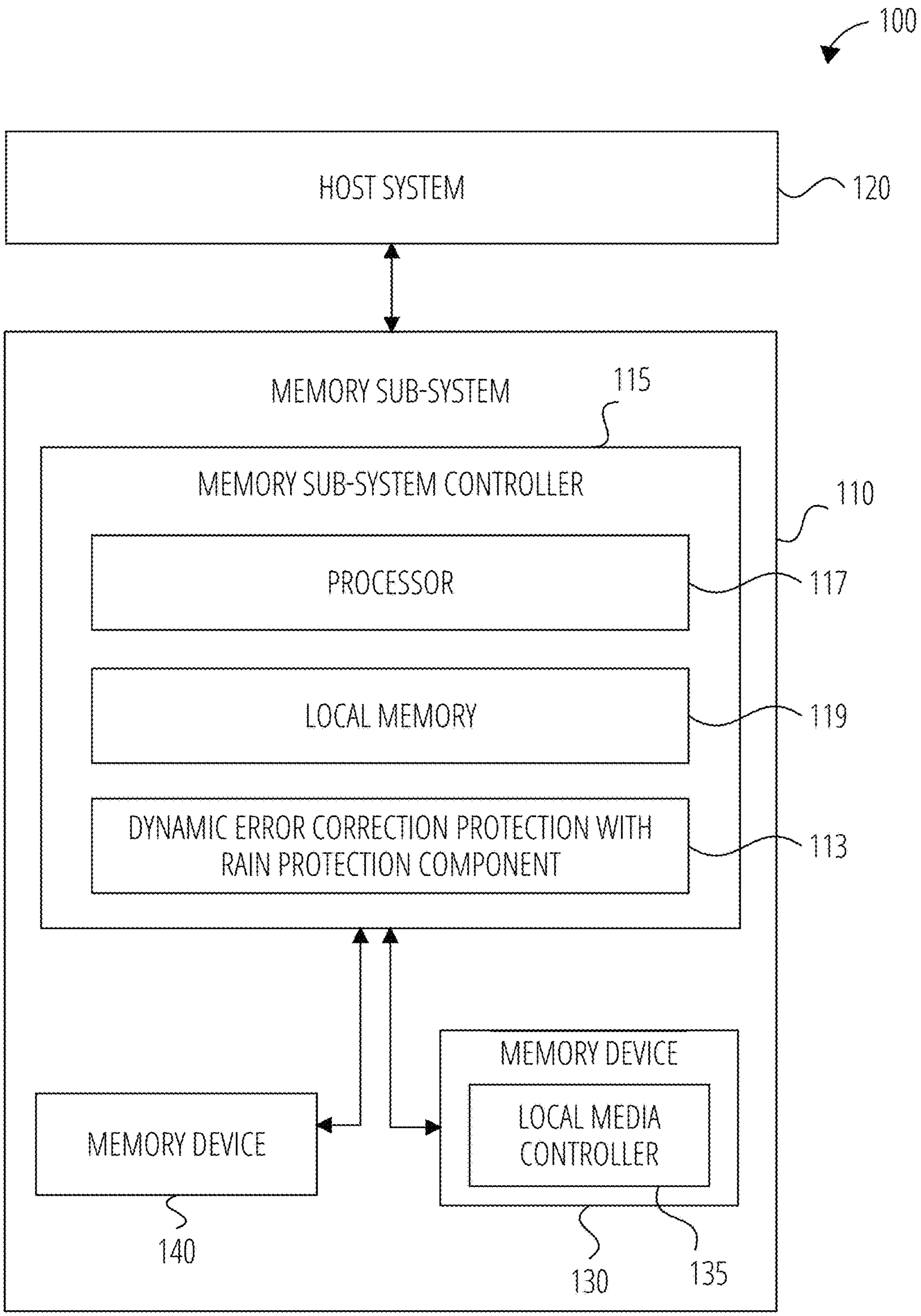
FIG. 1 is a diagram illustrating an example computing system that includes a memory sub-system, in accordance with some example embodiments of the present disclosure.

Aspects of the present disclosure are directed to dynamic error correction protection with redundant array of independent NAND-type memory devices (RAIN) protection for a memory system, such as a memory sub-system. The RAIN protection can comprise one of various types of RAIN techniques for data error-correction. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as “host data” or “user data.”

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

Conventional memory sub-systems can employ error-correction techniques, such as using a RAIN technique, to protect data (e.g., host or user data) stored on the memory sub-systems. Error-correction techniques can comprise calculating parity (e.g., exclusive OR (XOR) parity) across some collection of data (e.g., host/user data) being error-protected. By such error-correction techniques, if a data member of the collection is lost (e.g., corrupted) for any reason, the parity calculation can be re-performed and the lost data recreated. As error-correction techniques, such as RAIN techniques, get more complex, so can the number of parallel parity calculations performed to achieve the error-correction protection, and the memory resources needed to perform the parallel parity calculations. For example, when the set of memory components comprises multi-plane NAND-type memory devices, such as triple-level cell (TLC) NAND-type memory devices, multiple (e.g., dozens of) parity calculations may need to be performed in parallel to implement data protection (e.g., for host/user data) stored on the memory sub-system. Data in such conventional memory sub-systems is usually written sequentially across multiple memory device die (e.g., NAND-type memory device die) of one or more NAND-type memory devices. When the data is completely written across a given row of blocks of a specified set of memory device die of the one or more NAND-type memory devices, the RAIN parity calculation is performed and stored in a parity block associated with the given row (e.g., wordline).

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as “garbage collection data.”

“User data” hereinafter generally refers to host data and garbage collection data. “System data” hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more memory device die. Each memory device die (hereafter referred to as memory die) can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Generally, writing data to such memory devices involves programming (by way of a program operation) the memory devices at the page level of a block, and erasing data from such memory devices involves erasing the memory devices at the block level (e.g., page level erasure of data is not possible). Certain memory devices, such as NAND-type memory devices, comprise one or more blocks, (e.g., multiple blocks) with each of those blocks comprising multiple pages, where each page comprises a subset of memory cells of the block, and where a single wordline of a block (which connects a group of memory cells of the block together) defines one or more pages of a block (depending on the type of memory cell). Depending on the embodiment, different blocks can comprise different types of memory cells. For instance, a block (a single-level cell (SLC) block) can comprise multiple SLCs, a block (a multi-level cell (MLC) block) can comprise multiple MLCs, a block (a triple-level cell (TLC) block) can comprise multiple TLCs, a block (a quad-level cell (QLC) block) can comprise QLCs, and a block (a penta-level cell (PLC) block) can comprise PLCs. Other blocks comprising other types of memory cells (e.g., higher-level memory cells, having higher bit storage-per-cell) are also possible.

Each worldline (of a block) can define one or more pages depending on the type of memory cells (of the block) connected to the wordline. For example, for an SLC block, a single wordline can define a single page. For a MLC block, a single wordline can define two pages-a lower page (LP) and an upper page (UP). For a TLC block, a single wordline can define three pages—a lower page (LP), an upper page (UP), and an extra page (XP). For a QLC block, a single wordline can define four pages-a lower page (LP), an upper page (UP), an extra page (XP), and a top page (TP) page. As used herein, a page of LP page type can be referred to as a "LP page," a page of UP page type can be referred to as a "UP page," a page of XP page type can be referred to as a "XP page," and a page of TP page type can be referred to as a "TP page." Each page type can represent a different level of a cell (e.g., QLC can have a first level for LPs, a second level for UPs, a third level for XPs, and a fourth level for TPs). To write data to a given page, a wordline associated with the given page is programmed according to a page programming algorithm (e.g., that causes one or more voltage pulses or pulses to memory cells of a block based on the memory). Generally, programming a single wordline of a block results all the pages in the single wordline being programmed, where the number pages being programmed depends on the type of block. For example, programming a single wordline of a QLC block usually results in four pages (e.g., LP, UP, XP, TP pages) associated with the single wordline being programmed.

In conventional memory systems (e.g., memory sub-systems), each page of a block (of a memory device) comprises a certain number of codewords, where each codeword comprises a payload portion (or payload) for storing a certain number of data sectors (or sectors) that store data (or host data) from a host system, and where each codeword comprises a non-payload portion that can include protection data (e.g., parity data, such as low-density parity-check (LDPC) data) for protecting (e.g., facilitating error correction) of all the data in the codeword. The non-payload portion can also include protection information, cyclic redundancy check (CRC) data, and metadata (e.g., security metadata and firmware metadata), and the like. For instance, the size of a sector used by a host system can be set to 512 bytes, and NAND-type memory devices can be configured with 16-kilobyte pages each comprising four 4096-byte codewords, and with each codeword comprising a payload that stores eight 512-byte sectors and comprising parity data for facilitating error correction of the host data stored in the payload. Depending on the memory cell type, a reading of a wordline can comprise one or more pages (e.g., 16-kilobyte pages) being read at a given time. For instance, reading a wordline of a SLC block can result in the reading of one 16-kilobyte page, reading a wordline of a MLC block can result in the reading of two 16-kilobyte pages (UP and LP), reading a wordline of a TLC block can result in the reading of three 16-kilobyte pages (UP, LP, XP), and reading a wordline of a QLC block can result in the reading of four 16-kilobyte pages (UP, LP, XP, and TP). A given block (e.g., SLC, MLC, TLC, QLC block) can comprise multiple wordlines.

Different groups of memory cells of a memory device can have different bit error rates in reading the states of the memory cells and thus the data represented by the states. For example, bit error rates can differ from wordline to wordline, from page type to page type, or from memory die to memory die. For instance, error rate differences can result from variations in manufacturing processes, or intrinsic properties of the design or layout of circuits on an integrated circuit die. As a result, certain physical memory addresses have better error rates, and other physical memory addresses have worse. The error rates that dictate reliability consideration are from the worst-case stresses the memory device may be subjected to, such as reading and writing at extreme temperatures, or reading after years of being powered off. Overall, the worst error rates can be different based on various factors, such as memory addresses, memory locations (e.g., wordlines), stress (e.g., operating temperature), usage patterns (e.g., power off periods), etc.

To provide reliable error recovery for the worst-performing groups of memory cells, a memory device is usually designed to support storage of sufficient redundant information for each codeword. Additionally, to avoid a memory device having unnecessary memory cells configured for high performance groups of memory cells, the memory device can be designed to provide sufficient support for a majority of memory cell groups to recover bit errors by decoding codewords, and dynamically deploying an additional level of error correction technique for select memory cell groups that have higher bit error rates (to improve error recovery capability of the select memory cell groups). The dynamic error correction technique can comprise dynamically adjusting the amount of redundant information stored in memory cells of a wordline based on a bit error rate of those memory cells. For example, in response to determining that a bit error rate of the wordline is above a threshold value, the memory system can store first data items as independent first codewords of an error correction code technique into a first portion of the memory cells of the wordline, generate second data items as redundant information from the first codewords, and store the second data items in a second portion of the memory cells of the wordline. If the bit error rate is below the threshold value, third data items can be stored as independent second codewords of the same length as the first codewords in the memory cells of the wordline.

The dynamic error correction technique can be implemented by using dynamic exclusively OR (dynamicXOR) stripes, where parity data (or parity) of each stripe is generated by exclusive OR-ing (XORing) two or more codewords (e.g., translation units (TUs)) across different page types (of the memory cells) associated with one or more wordlines (e.g., within a single plane within a single memory die, or across different planes of the single memory die). Such a dynamic error correction technique can be applied to TLC, QLC, PLC, or other-level-cell (e.g., other multi-bit-per-cell) blocks. The parity data generated can be stored within the same wordline (e.g., as one of the codewords stored on a plane), or stored within another wordline (e.g., in the same block or a different block). FIG. 2 illustrates an example of this error correction technique being used. In particular, codewords (e.g., translation units) 0 through 14 of plane 0 of a NAND-type memory device die (that comprises QLC blocks) can define a dynamicXOR stripe in FIG. 2, with codeword 15 being used to store parity data for the stripe. During a write operation, a dynamicXOR parity codeword (pCW) (comprising parity data) for a stripe comprising codewords 0 through 14 (CW_0 through CW_14) is generated by XORing codewords 0 through 14 (pCW=CW_0⊕CW_1⊕CW_2⊕CW_3⊕CW_4⊕CW_5⊕CW_6⊕CW_7⊕CW_8⊕CW_9⊕CW_10⊕CW_11⊕CW_12⊕CW_13⊕CW_14) across the pages types (LP, UP, XP, TP) of plane 0, and the resulting dynamicXOR parity codeword is stored in codeword 15 (CW15), thereby storing the parity data in the same wordline. It will be understood that other stripes across different page types can also be defined.

Eventually, a reading of a given codeword (e.g., codeword (CW3)) can be requested, such as by a host system (e.g., a host read request comprising a logical memory address that translates to a physical memory address corresponding to the given codeword). Based on the read request, a host system can read a page associated with the given codeword and attempt to decode the given codeword using a decoding methodology, such as LDPC decode process (e.g., implemented by an LDPC decoder). If the decode of the (requested) given codeword fails, data recovery of the given codeword can be attempted based on the dynamicXOR stripe. For example, assume codeword 3 (CW3) was requested by a host system and decode (e.g., LDPC decoding) of CW3 failed. At 720, assuming the dynamicXOR stripe comprises codewords 0 through 15 with codeword 15 storing the parity data for the stripe, data recovery can comprise attempting to decode all other codewords of the stripe (CW0 through 2, CW4 through CW14, and CW15), and generating (or updating) a vector (e.g., stripe vector or S vector) by XORing decoded bits (e.g., hard information bits, or hard bits) of passing codewords (e.g., codewords for which decoding succeeded) with un-decoded (raw) bits of failing codewords (e.g., codewords for which decoding initially failed). For example, if we were to assume codewords (e.g., translation units) 0, 3, 6, 10, 13 are failed (e.g., errored) codewords, a vector can be generated (or updated) by XORing decoded bits (e.g., hard information bits, or hard bits) of passing codewords 1, 2, 4, 5, 7, 8, 9, 11, 12, 14, 15 (with codeword storing the previously-generated parity data) and un-decoded (raw) bits of failing codewords 0, 3, 6, 10, 13 as follows: vector=CW_0⊕DECODED(CW_1)⊕DECODED(CW_2)⊕CW_3⊕DECODED(CW_4)⊕DECODED(CW_5)⊕CW_6⊕DECODED(CW_7)⊕DECODED(CW_8)⊕DECODED(CW_9)⊕CW_10⊕DECODED(CW_11)⊕DECODED(CW_12)⊕CW_13⊕DECODED(CW_14)⊕DECODED(CW_15). The resulting vector can be used as an input (e.g., soft information input or soft input) for decoding (e.g., using LDPC) any of failed codewords 0 through 15 (e.g., codewords 0, 3, 6, 10, 13) of the stripe, such as codeword 3 (CW3). For example, one bit from the resulting vector can be used as soft information-input data (e.g., in addition to soft information-input data) to an LDPC decode process that receives one or more hard information bits and one or more soft information bits with respect to a memory cell.

Unfortunately, conventional methodologies of using RAIN protection and using dynamicXOR protection can result in challenges/conflicts, especially with respect to how RAIN parity data and dynamicXOR parity is stored on a memory device (e.g., with respect to a given wordline). In particular, where a memory device implements plane-level RAIN protection or memory die-level RAIN protection (also referred to herein as die-level RAIN protection), a memory location (e.g., designated codeword within a given wordline) used by conventional RAIN to store RAIN parity data can be the same memory location (e.g., same designated codeword) used by conventional dynamicXOR to store dynamicXOR parity data. Such a conflict can prevent the concurrent use of dynamicXOR protection and RAIN protection to protect data (e.g., host data) stored on a given memory device of a memory system.

Various example embodiments described herein provide for dynamic error correction protection with RAIN protection for a memory system, such as a memory sub-system. In particular, various example embodiments provide one or more different solutions for enabling or facilitating concurrent use of dynamicXOR protection and RAIN protection on a memory device while avoiding the challenges/conflicts suffered by conventional memory systems.

According to various example embodiments, a solution for dynamicXOR protection with RAIN protection comprises a memory system generating dynamicXOR parity data that protects all non-parity codewords (codewords storing non-parity data) of a select wordline (e.g., dynamicXOR parity data for each plane across multiple planes of one or more memory die), storing the dynamicXOR parity data in designated codewords (hereafter referred to as a dynamicXOR parity codewords) of the select wordline on each plane, and applying RAIN protection (e.g., plain-level or die-level RAIN protection) to all non-parity codewords while skipping RAIN protection for dynamicXOR parity codewords (e.g., across the multiple planes of the one or more memory die). For various example embodiments, the RAIN protection for dynamicXOR parity codewords is skipped because each dynamicXOR parity codeword does not store host data. Where a memory device comprises TLCs and each individual wordline on each plane comprises three pages (e.g., LP, UP, XP), each individual wordline can comprise twelve codewords (e.g., twelve TUs), where codewords 1 through 11 are non-parity codewords used to store non-parity data (e.g., host data) and codeword 12 is a dynamicXOR parity codeword used to store dynamicXOR parity data generated based on (e.g., by XOR-ing together) codewords 1 through 11. Where a memory device comprises QLCs and each individual wordline on each plane comprises three pages (e.g., LP, UP, XP, TP), each individual wordline can comprise 16 codewords (e.g., sixteen TUs), where codewords 1 through 15 are non-parity codewords used to store non-parity data (e.g., host data) and codeword 16 is a dynamicXOR parity codeword used to store dynamicXOR parity data generated based on (e.g., by XOR-ing together) codewords 1 through 16.

Additionally, codewords (RAIN parity codewords) of the select wordline on a designated plane (RAIN parity plane) used to store RAIN parity data (for all the non-parity codewords) can be dynamicXOR protected. For various example embodiments, where plane-level RAIN protection is used by a memory system, the RAIN data generated for multiple planes of a memory device is stored in RAIN parity codewords (e.g., codewords 1 through 11) of a RAIN plane of a specific memory die of the memory device, dynamicXOR parity data is generated for the RAIN parity codewords of the RAIN parity plane, and the dynamicXOR parity data is stored in a dynamicXOR parity codeword (e.g., codeword 12) of the designated plane. For some example embodiments, where die-level RAIN protection is used by a memory system, the RAIN data generated for multiple planes of a memory device is stored in RAIN parity codewords (e.g., codewords 1 through 11) of multiple RAIN planes of a RAIN parity memory die of the memory device. For each individual RAIN plane of the RAIN parity memory die, dynamicXOR parity data can then be generated for the individual RAIN plane based on RAIN parity codewords of the individual RAIN parity plane and stored in a dynamicXOR parity codeword (e.g., codeword 12) of the individual RAIN parity plane.

Some example embodiments provide a solution for dynamicXOR protection with RAIN protection (e.g., plane or die-level RAIN protection) for memory systems that support input/output (I/O) commands (e.g., read or write commands) for larger data sizes (e.g., 16 KB I/O commands involving two pages/eight codewords per a command versus 4 KB I/O commands involving one page/four codewords per a command). In particular, some example embodiments implement dynamicXOR protection with die-level RAIN protection by storing dynamicXOR parity data in a last plane (e.g., in a set of dynamicXOR codewords in a last page of the last plane, such as XP page of a TLC memory die or a TP page of a QLC memory die) of each memory die one through N−1 of a memory device. Additionally, for some example embodiments, RAIN parity data is generated for all codewords of each memory die one through N−1 and stored in RAIN parity codewords of the Nth memory die (RAIN parity memory die) of the memory device. According to various example embodiments, the RAIN parity data stored in a last plane (e.g., in a set of RAIN parity codewords in a last page of the last plane, such as XP page of a TLC memory die or a TP page of a QLC memory die) of the Nth memory die (RAIN parity memory die) automatically provides dynamicXOR protection through the mathematical properties of the XOR operations without a need to perform dynamicXOR parity construction on the RAIN parity codewords of the Nth memory die. As a result, the RAIN parity data stored in the last plane (e.g., in the set of RAIN parity codewords in the last page) of the Nth memory die (RAIN parity memory die) can be used dynamicXOR parity data for dynamicXOR-based error correction of a codeword within the Nth memory die. Implementing dynamicXOR protection with die-level RAIN protection in this way can enable single read operations (e.g., NAND read operation) for 16 KB while maintaining both die-level RAIN and dynamicXOR protection, thereby overcoming a two-page read limitation.

Various example embodiments implement dynamicXOR protection with plane-level RAIN protection by storing dynamicXOR parity data in a last plane (e.g., a last page of the last plane, such as XP page of a TLC memory die or a TP page of a QLC memory die) of each memory die one through N−1, while RAIN parity data generated and stored on a last plane of the Nth memory die automatically provides dynamicXOR protection for all planes of the Nth memory die through the mathematical properties of the XOR operations without a need to perform dynamicXOR parity construction. Implementing dynamicXOR protection with plane-level RAIN protection in this way can enable single read operations (e.g., NAND read operation) for 16 KB while maintaining both plane-level RAIN and dynamicXOR protection, thereby overcoming a two-page read limitation.

As used herein, a physical memory location of a memory die can comprise a block, a page, or a memory cell. For instance, where a physical memory location comprises a page or a memory cell, a set of physical memory locations can represent a single block or multiple blocks. The set of physical memory locations can be a set of contiguous physical memory locations. As used herein, storing data on one or more physical memory locations of a memory die can comprise writing data to the one or more physical memory locations, where the writing can comprise programming one or more pages of a block with the data.

As used herein, a translation unit (TU) of a memory device can comprise (e.g., store) one or more codewords, and can be referenced by a physical memory address (or physical address) of the memory device. For various embodiments, a logical memory address (or logical address) of a memory system is translated into a physical memory address of a memory device.

As used herein, a stripe can comprise a plurality of elements of a memory device, such as pages or codewords (e.g., translation units) of one or more pages, that are grouped together for a read error correction technique (e.g., parity-based error correction). An example of a stripe can include a dynamicXOR stripe as described herein. For example, a dynamicXOR stripe can comprise a plurality of codewords 1 through N that are exclusively-OR'd together to generate parity data (or parity) for the dynamicXOR stripe, where the generated parity can be later used (e.g., to generate a stripe vector that is used) to decode (e.g., assist in decoding) an individual codeword of the dynamic XOR stripe that is failing to decode without an error. Though various embodiments may be described herein with respect to a stripe (e.g., dynamicXOR stripe) that comprises codewords 1 through 11, that has codeword 12 storing parity data for the stripe, and that has codewords 1 through 12 stored across pages in a single TLC block, the structure and size of stripes can vary between different embodiments.

As used herein, hard information data (or hard bits) can comprise one or more bits determined based on detecting a voltage charge currently stored (e.g., or held) by a memory cell (of a block of a memory device) and based on one or more hard voltage thresholds (or hard thresholds) associated with the memory cell. For various embodiments, hard information data determined for a memory cell represents a data value actually stored by the memory cell. A hard voltage threshold (or hard threshold) of a memory cell can refer to a discrete voltage threshold level (or discrete threshold level) that separates different ranges (or windows) of voltage charge that the memory cell can store, and the different data values represented by each of those different ranges (or windows). For instance, a memory cell of a QLC block can store 4-bits, and can have 16 windows for values (e.g., binary values of 0000 to 1111) separated by 15 discrete threshold levels.

As used herein, soft information data (or soft bits) of a memory cell can comprise one or more bits that indicate where the voltage charge (detected as being stored by a memory cell) lies between two hard thresholds of the memory cell, thereby providing higher-resolution information regarding the voltage charge currently stored by the memory cell (than provided by hard information data alone). Specifically, soft information data can indicate how close a voltage charge sampled/detected from a memory cell is to a hard threshold of the memory cell and, therefore, indicate the probability that the voltage charge (sampled/detected from the memory cell) was sampled/detected correctly. In this way, soft information data can represent the reliability, confidence level, or probability of the hard information data (hard bits) read from one or more memory cells of a memory device, where such the reliability/confidence level/probability can be useful in data error correction techniques. Soft information data can be determined based on detecting a fractional component of a voltage charge currently stored by the memory cell and based on fractional voltage thresholds (e.g., soft thresholds). For instance, where a sampled/detected voltage charge of a memory cell of a TLC block falls between a first voltage threshold and a second voltage threshold, and the hard bits are determined to comprise "101," the soft bit information (e.g., bit value of "1" or "0") can indicate whether the sampled/detected voltage charge is closer to the first voltage threshold or the second voltage threshold and the probability of an error in the sampling/detection of the voltage charge. Where hard information data accompanied by soft information data that indicates a voltage charge sampled/detected from a memory cell is close to a hard threshold of the memory cell, that voltage charge has a lower probability of being correct than a voltage charge sampled/detected with soft information that indicates the voltage charge sampled/detected is centered between two hard thresholds. Decode processes (e.g., signal processing algorithms), such as a Low Density Parity Codes (LDPC) process, can use hard information data for a memory cell and soft information data for the memory cell (e.g., in terms of error probabilities) to determine (e.g., decode) a data value stored by the memory cell.

As used herein, undecoded data of a given page of a memory device can comprise undecoded hard information data obtained (e.g., as part of a page-level read operation performed on the given page) for a plurality of memory cells of the memory device that form the given page and store the actual (raw) data of the given page. Undecoded data for a given codeword of the given page can comprise those portions of hard information data that are obtained (from the memory device) for the given page and that correspond to memory cells storing the actual (raw) data of the given codeword.

As used herein, decoded data of a codeword can comprise decoded hard information data generated by successfully decoding the undecoded hard information data of the codeword (e.g., by a decode process or with use of a read error handling when the decode process fails). For some embodiments, a given codeword is decoded by decoding (without error) hard information data of the given codeword using the soft information data of the given codeword (e.g., as soft input to a decode process). In the event an error is encountered during the decoding, a read error handler process (as described herein) can be performed or triggered, which can recover the decoded data from the (failing) codeword using one or more error recovery techniques. An example of hard information data and soft information obtained for one or more memory cells (e.g., a given page or a given codeword) of a memory device can include, without limitation, one hard bit-two soft bit (1H2S) information for each of the memory cells.

As used herein, a non-parity codeword comprises a codeword that is used (or designated for use) to store non-parity data, such as host or user data. As used herein, a parity codeword comprises a codeword that is used (or designated for use) to store parity data, such as parity data generated by dynamicXOR operation (dynamicXOR parity data) or RAIN operation (RAIN parity data). As used herein, a dynamicXOR parity codeword can refer to a parity codeword used (or designated for use) to store dynamicXOR parity data (e.g., for a stripe of codewords), and a RAIN parity codeword can refer to a parity codeword used (or designated for use) to store RAIN parity data (e.g., for a stripe of codewords). As used herein, a RAIN parity plane of a memory die comprises a plane of a memory die designated for storage of RAIN parity data. As used herein, a RAIN parity memory die (also referred to herein as a parity memory die) of a memory device comprises a memory die of the memory device where all planes of the memory die are used (or designated for use) as RAIN parity planes. As used herein, a non-parity memory die of a memory device comprises a memory die of a memory device where zero or less than all planes of the memory die are used as RAIN parity planes (e.g., non-parity memory die may include a single RAIN parity plane, and the remaining planes are used to store host data).

Disclosed herein are some examples of using dynamic error correction protection with RAIN protection for a memory system, as described herein.

FIG. 1 illustrates an example computing system 100 that includes a memory sub-system 110, in accordance with some example embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. The computing system 100 can be used to support or implement various types of applications, including those relating to artificial intelligence (AI).

The computing system 100 can include a host system 120 that is coupled to one or more memory sub-systems 110. In some example embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further use an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND-type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND-type flash memory includes, for example, two-dimensional (2D) NAND and 3D NAND.

Each of the memory devices 130, 140 can include one or more arrays of memory cells. One type of memory cell, for example, SLCs, can store one bit per cell. Other types of memory cells, such as MLCs, TLCs, and QLCs, can store multiple bits per cell. In some example embodiments, each of the memory devices 130, 140 can include one or more arrays of memory cells such as SLCs, MLCs, TLCs, QLCs, or Penta-level cells (PLCs) or any combination of such. In some example embodiments, a particular memory device can include an SLC portion, and an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as an MLC block, a block comprising TLCs can be referred to as a TLC block, and a block comprising QLCs can be referred to as a QLC block.

Although non-volatile memory components such as NAND-type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative- or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some example embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another example embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some example embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some example embodiments, the memory device 130 includes local media controller 135 that operates in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some example embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a dynamic error correction protection with RAIN protection component 113 (hereafter, the dynamic error correction protection component 113) that enables or facilitates the memory sub-system controller 115 to implement dynamic error correction protection with RAIN protection (e.g., plane-level or die-level RAIN protection) on the memory sub-system 110 in accordance with various example embodiments described herein. Alternatively, some or all of the dynamic error correction protection component 113 is included by the local media controller 135, thereby enabling the local media controller 135 to enable or facilitate dynamic error correction protection with RAIN protection on the memory sub-system 110.

FIG. 2 is a diagram illustrating an example stripe 200 that can be used in connection with various embodiments of the present disclosure. As described herein, dynamicXOR parity data can be generated for the stripe 200 and stored associated with a codeword. In FIG. 2, the stripe 200 is formed by codewords 0 through 14, with codeword 15 (204) storing dynamicXOR parity data (or dynamicXOR parity) for the stripe 200. Codewords 0 through 15 are stored across pages LP, UP, XP, TP of a QLC block on plane 0 of NAND-type memory device die. Codewords 0 through 3 are part of the LP page, codewords 4 through 7 are part of the UP page, codewords 8 through 11 are part of the XP page, and codewords 12 through 15 are part of the TP page. In FIG. 2, codewords 0, 3, 6, 10, 13 can represent failing codewords 202 of the stripe 200.

Figure 3:
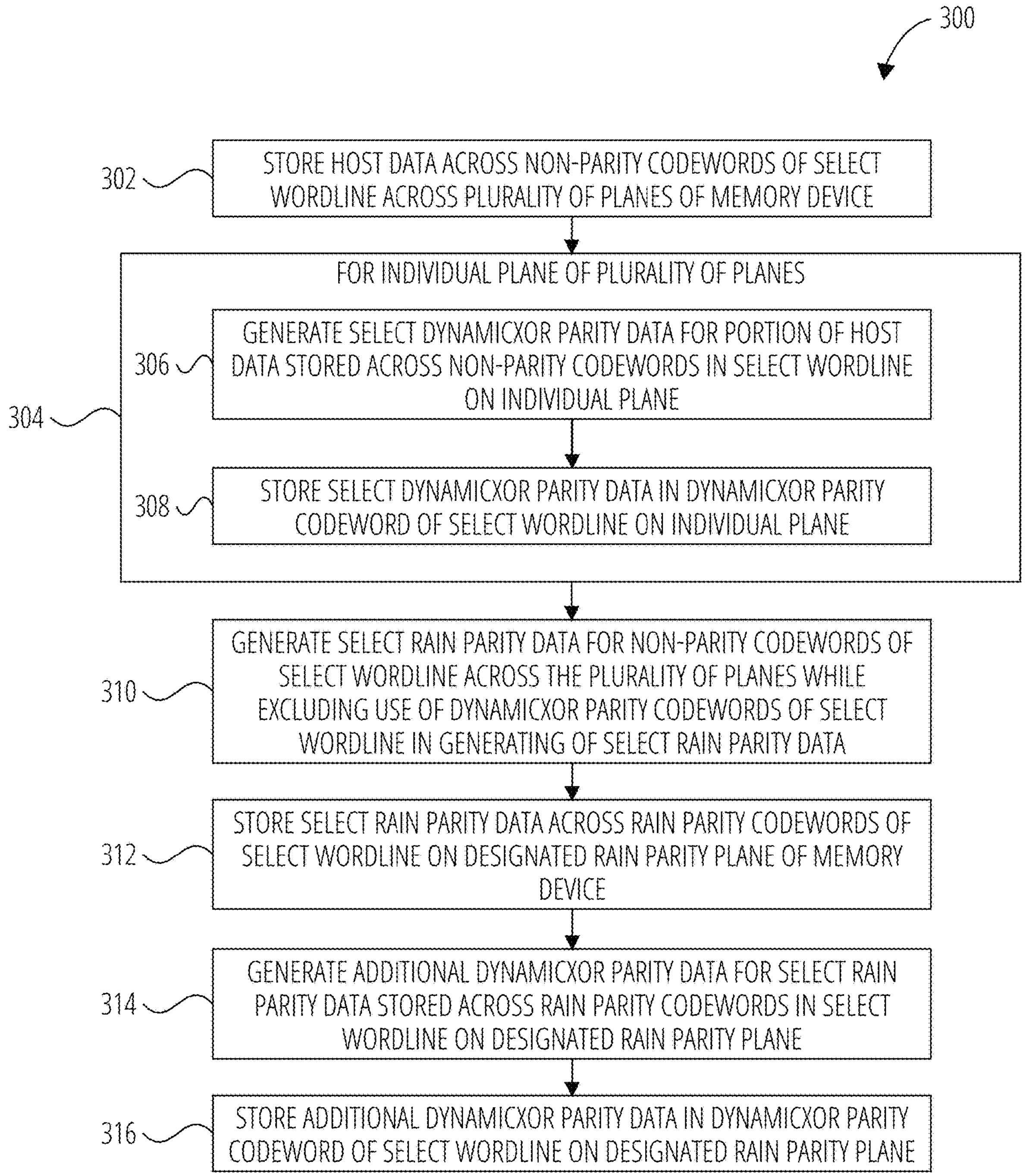
FIG. 3 through FIG. 5 are flow diagrams of example methods for dynamic error correction protection with redundant array of independent NAND-type memory devices (RAIN) protection for a memory system, in accordance with some example embodiments of the present disclosure.
Figure 4:
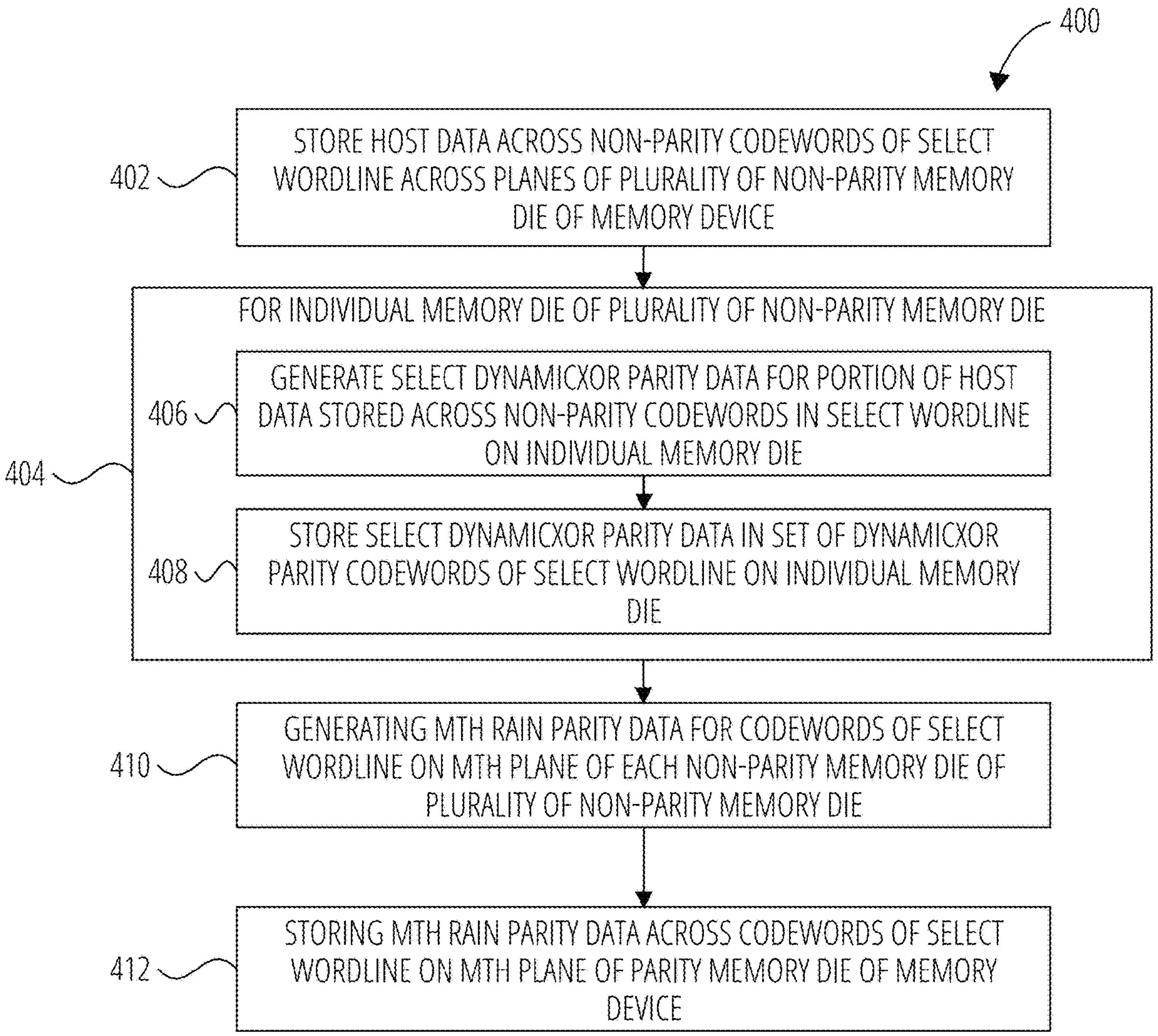
Figure 5:
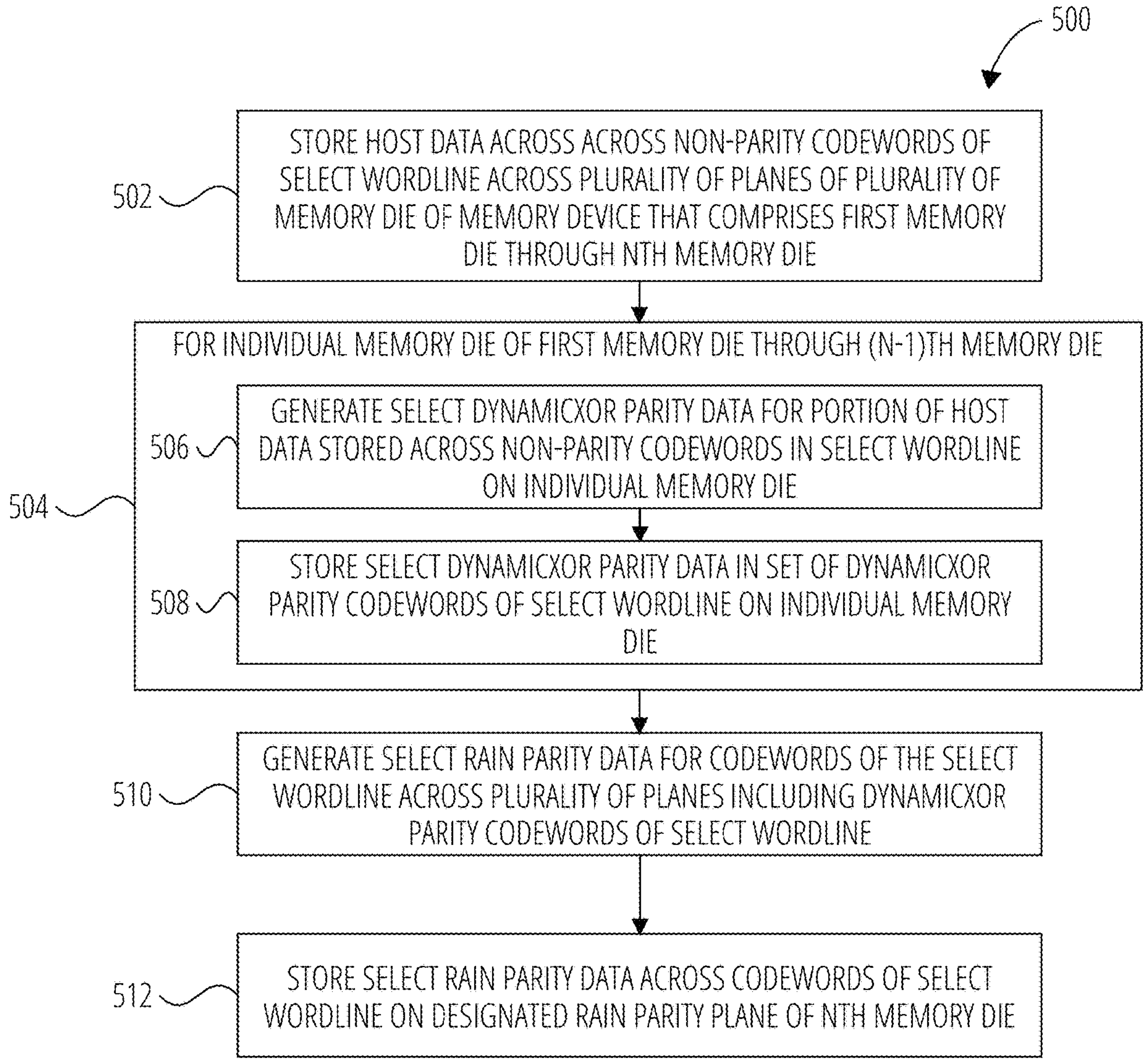

FIG. 3 through FIG. 5 are flow diagrams of example methods 300, 400, 500 for dynamic error correction protection with RAIN protection for a memory system, in accordance with some example embodiments of the present disclosure. Any of methods 300, 400, 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some example embodiments, any of methods 300, 400, 500 is performed by the memory sub-system controller 115 of FIG. 1 based on the dynamic error correction protection component 113. Additionally, or alternatively, for some example embodiments, any of methods 300, 400, 500 is performed, at least in part, by the local media controller 135 of the memory device 130 of FIG. 1. Although shown in a particular sequence or order, unless otherwise specified, the order of the processes can be modified. Thus, the illustrated example embodiments should be understood only as examples, and the illustrated processes can be performed in a different order, and some processes can be performed in parallel. Additionally, one or more processes can be omitted in various example embodiments. Thus, not all processes are used in every example embodiment. Other process flows are possible. Though each of methods 300, 400, 500 is described with respect to a single (select) wordline of a memory device, any of methods 300, 400, 500 can be performed with respect to each of multiple wordlines (e.g., all wordlines) of a memory device.

Referring now to FIG. 3, at operation 302 a processing device (e.g., the processor 117 of the memory sub-system controller 115) stores (or causes storage of) host data across non-parity codewords of a select wordline across a plurality of planes of the memory device. Operation 302 can represent the performance of multiple write operations (e.g., over a period of time) in response to one or more requests received by a memory system (e.g., memory sub-system 110) from a host system (e.g., 120).

During operation 304, the processing device performs operations 306 and 308 for an individual plane of the plurality of planes of the memory device (e.g., 140). For some example embodiments, operation 304 is performed for each individual plane of the plurality of planes of the memory device. At operation 306, the processing device generates (e.g., by one or more dynamicXOR operations) select dynamicXOR parity data for a portion of the host data stored across non-parity codewords in the select wordline on the individual plane. For various example embodiments, operation 306 comprises the processing device XORing together the non-parity codewords (e.g., forming a dynamicXOR stripe) in the select wordline on the individual plane to generate the select dynamicXOR parity data for the individual plane.

For operation 308, the processing device stores (or causes storage of) the select dynamicXOR parity data (generated by operation 306) in a dynamicXOR parity codeword of the select wordline on the individual plane. For some example embodiments, the dynamicXOR parity codeword of the select wordline on the individual plane is a last codeword of a last page of the select wordline on the individual plane. For instance, the last page can be a XP page where the memory device comprises TLC-based memory die, and the last page can be a TP page where the memory device comprises QLC-based memory die. Each page (e.g., 4 KB page) can comprise four codewords. The plurality of planes can comprise planes across one or more memory die of the memory device. For some example embodiments, each memory die is a TLC memory die comprising TLCs, where the select wordline on each plane comprises a lower page (LP), an upper page (UP), and an extra page (XP). This can enable the select wordline on each plane to comprise twelve codewords. Additionally, for some example embodiments, each memory die is a QLC memory die comprising QLCs, where the select wordline on each plane comprises a lower page (LP), an upper page (UP), an extra page (XP), and a top page (TP). This can enable the select wordline on each plane to comprise sixteen codewords.

Eventually, at operation 310, the processing device generates (e.g., by one or more RAIN operations) select RAIN parity data for non-parity codewords (e.g., all non-parity codewords) of the select wordline across the plurality of planes while excluding use of dynamicXOR parity codewords of the select wordline in generation of the select RAIN parity data. For operation 312, the processing device stores (or causes storage of) the select RAIN parity data (generated by operation 310) across non-parity codewords of the select wordline on a designated RAIN parity plane of the memory device. For various example embodiments, operation 310 comprises the processing device generating RAIN parity data for Mth non-parity codewords of the select wordline across the plurality of planes based on a Mth non-parity codeword of the select wordline on each plane of the plurality of planes, and operation 312 comprises the processing device storing the RAIN parity data for the Mth non-parity codewords in a Mth non-parity codeword of the select wordline on the designated RAIN parity plane.

During operation 314, the processing device generates (e.g., by one or more dynamicXOR operations) additional dynamicXOR parity data for the select RAIN parity data stored across RAIN parity codewords (e.g., all RAIN parity codewords) in the select wordline on the designated RAIN parity plane. At operation 316, the processing device stores (or causes storage of) the additional dynamicXOR parity data in a dynamicXOR parity codeword of the select wordline on the designated RAIN parity plane.

Where a memory system (e.g., memory sub-system 110) implements die-level RAIN protection, the memory device of the memory system can comprise a plurality of non-parity memory die and a parity memory die, where each memory die comprises multiple planes. In such implementations, the plurality of planes of method 300 can represent a Mth plurality of non-parity memory die that comprises a Mth plane of each non-parity memory die of the plurality of non-parity memory die, and the designated RAIN parity plane can represent a Mth plane of the parity memory die. Where a memory system (e.g., memory sub-system 110) implements plane-level RAIN protection, the plurality of planes can comprise a first plane through a (M−1)th plane across a first memory die through a Nth memory die of the memory device of the memory system, where the designated RAIN parity plane is a Mth plane, and where the Mth plane is part of the Nth memory die. An example use of method 300 with respect to plane-level RAIN protection is illustrated and described with respect to FIG. 6, and an example use of method 300 with respect to die-level RAIN protection is illustrated and described with respect to FIG. 7.

Referring now to FIG. 4, method 400 can be used with a memory system that implements die-level RAIN protection and that supports large I/O operations (e.g., 16 KB read and write operations). An example use of method 400 with respect to die-level RAIN protection is illustrated and described with respect to FIG. 8.

At operation 402, a processing device (e.g., the processor 117 of the memory sub-system controller 115) stores (or causes storage of) host data across non-parity codewords of a select wordline across planes of a plurality of non-parity memory die of a memory device. Operation 402 can represent the performance of multiple write operations (e.g., over a period of time) in response to one or more requests received by a memory system (e.g., memory sub-system 110) from a host system (e.g., 120).

During operation 404, the processing device performs operations 406 and 408 for an individual memory die of the plurality of non-parity memory die of the memory device (e.g., 140). For some example embodiments, operation 404 is performed for each individual memory die of the plurality of non-parity memory die of the memory device. At operation 406, the processing device generates (e.g., by one or more dynamicXOR operations) select dynamicXOR parity data for a portion of the host data stored across non-parity codewords in the select wordline on the individual memory die. For various example embodiments, operation 406 comprises the processing device XORing together the non-parity codewords (e.g., forming a dynamicXOR stripe) in the select wordline on the individual memory die to generate the select dynamicXOR parity data.

For operation 408, the processing device stores (or causes storage of) the select dynamicXOR parity data (generated by operation 406) in a set of dynamicXOR parity codewords of the select wordline on the individual memory die. For some example embodiments, the set of dynamicXOR parity codewords on the individual memory die comprises a set of codewords on a last plane of the individual memory die. Additionally, for some example embodiments, the set of dynamicXOR parity codewords on the individual memory die comprises a set of codewords (e.g., four codewords) of a last page of a last plane of the individual memory die. As described herein, the last page can be a XP page where the memory device comprises TLC-based memory die, and the last page can be a TP page where the memory device comprises QLC-based memory die.

Eventually, at operation 410, the processing device generates (e.g., by one or more RAIN operations) Mth RAIN parity data for codewords of the select wordline on a Mth plane of each memory die of the plurality of non-parity memory die. For some example embodiments, operation 410 does not exclude use of dynamicXOR parity codewords (of the select wordline on the Mth plane of each memory die of the plurality of non-parity memory die) during generation of the Mth RAIN parity data. At operation 412, the processing device stores (or causes storage of) the Mth RAIN parity data across codewords of the select wordline on a Mth plane of a parity memory die (e.g., designated RAIN parity memory die) of the memory device. According to various example embodiments, operations 410 and 412 are performed for multiple (e.g., all) planes of each memory die of the plurality of non-parity memory die. For instance, at operation 410 the processing device can generate (e.g., by one or more RAIN operations) (M+1)th RAIN parity data for codewords of the select wordline on a (M+1)th plane of each memory die of the plurality of non-parity memory die and, at operation 412, the processing device can store (or causes storage of) the (M+1)th RAIN parity data across codewords of the select wordline on a (M+1)th plane of the parity memory die (e.g., designated RAIN parity memory die).

Referring now to FIG. 5, method 500 can be used with a memory system that implements plane-level RAIN protection and that supports large I/O operations (e.g., 16 KB read and write operations). An example use of method 500 with respect to plane-level RAIN protection is illustrated and described with respect to FIG. 9.

At operation 502 a processing device (e.g., the processor 117 of the memory sub-system controller 115) stores (or causes storage of) host data across non-parity codewords of a select wordline across a plurality of planes of a plurality of memory die of a memory device, where the plurality of memory die comprises a first memory die through Nth memory die. Operation 502 can represent the performance of multiple write operations (e.g., over a period of time) in response to one or more requests received by a memory system (e.g., memory sub-system 110) from a host system (e.g., 120).

During operation 504, the processing device performs operations 506 and 508 for an individual memory die of the first memory die through (N−1)th memory die of the plurality of memory die. For some example embodiments, operation 504 is performed for each of the first memory die through (N−1)th memory die. At operation 506, the processing device generates (e.g., by one or more dynamicXOR operations) select dynamicXOR parity data for a portion of the host data stored across (e.g., all) non-parity codewords in the select wordline on the individual memory die. For various example embodiments, operation 506 comprises the processing device XORing together the non-parity codewords (e.g., forming a dynamicXOR stripe) in the select wordline on the individual memory die to generate the select dynamicXOR parity data for the individual memory die.

For operation 508, the processing device stores (or causes storage of) the select dynamicXOR parity data in a set of dynamicXOR parity codewords of the select wordline on the individual memory die. For some example embodiments, the set of dynamicXOR parity codewords on the individual memory die comprises a set of codewords on a last plane of the individual memory die. Additionally, for some example embodiments, the set of dynamicXOR parity codewords on the individual memory die comprises a set of codewords (e.g., four codewords) of a last page of a last plane of the individual memory die. As described herein, the last page can be a XP page where the memory device comprises TLC-based memory die, and the last page can be a TP page where the memory device comprises QLC-based memory die.

Eventually, at operation 510, the processing device generates (e.g., by one or more RAIN operations) select RAIN parity data for (e.g., all) codewords of the select wordline across the plurality of planes including dynamicXOR parity codewords of the select wordline. For operation 512, the processing device stores (or causes storage of) the select RAIN parity data (generated by operation 510) across codewords (e.g., RAIN parity codewords) of the select wordline on a designated RAIN parity plane of the Nth memory die. For some example embodiments, the plurality of planes comprises a first plane through a (M−1)th plane (e.g., across the first memory through the Nth memory die), the designated RAIN parity plane is a Mth plane, and the Mth plane is part of (e.g., is the last plane of) the Nth memory die.

Figure 6:
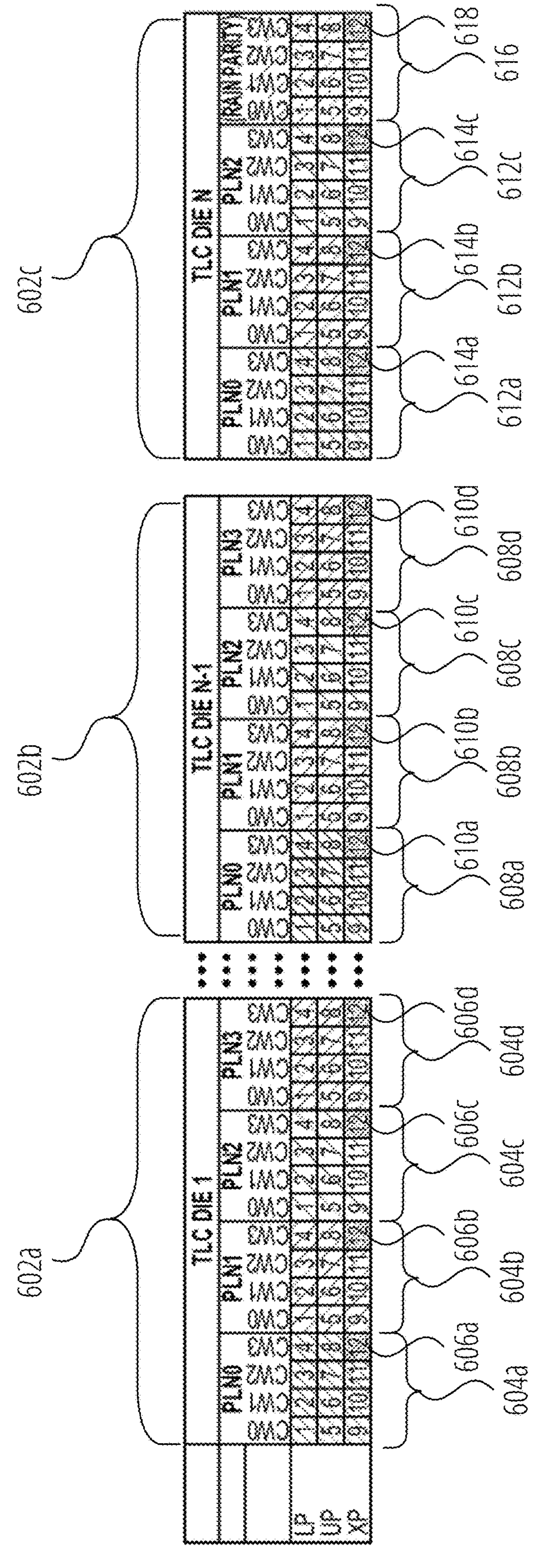
FIG. 6 illustrates an example of using dynamicXOR protection with plane-level RAIN protection, in accordance with some example embodiments of the present disclosure.

FIG. 6 illustrates an example of using dynamicXOR protection with plane-level RAIN protection, in accordance with some example embodiments of the present disclosure. In particular, FIG. 6 can represent an example implementation of method 300 of FIG. 3 with respect to plane-level RAIN protection. According to some example embodiments, plane-level RAIN protection protects against a single-plane defectivity. The dynamicXOR protection can protect against page or codeword-level errors.

FIG. 6 illustrates a single wordline of a plurality of TLC memory die of a memory device (e.g., 140) of a memory system (e.g., memory sub-system 110)—TLC memory die 1 (memory die 602*a*) through TLC memory die N (memory die 602*c*). Each TLC memory die in FIG. 6 comprises four planes (planes 0 through 3), as represented by plane 0 604*a* through plane 3 604*d* for memory die 602*a*, plane 0 608*a* through plane 3 608*d* for memory die 602*b*, and plane 0 612*a* through plane 2 612*c* and plane 616 for memory die 602*c*. For a single wordline, each plane comprises three pages-a LP, a UP, and a XP. Each page (e.g., each LP, UP, and XP) comprises four codewords-codeword 0 (CW0) through codeword 3 (CW3). The multiple pages in a single wordline on a single plane can form a block and, in FIG. 6 in particular, a TLC block given that the plane is on a TLC memory die. In comparison, as shown in FIG. 2 with respect to a QLC memory die, a single QLC block comprises four pages-a LP, a UP, a XP, and a TP—for a single wordline on a single plane. Each codeword in a single wordline on a single plane can be referred to as a translation unit (TU). Referring again to FIG. 6, as shown, the codewords within a single wordline on each plane on a TLC memory die can be referred to as TU1 through TU12-TU1 through TU4 for CW 0 through 3 in LP; TU5 through TU6 for CW 0 through 3 in UP; and TU9 through TU12 for CW 0 through 3 in XP.

According to various example embodiments, each plane of the TLC memory die 1 through N comprises a dynamicXOR parity codeword, as represented by codeword 606*a* for plane 0 604*a* of memory die 602*a*, codeword 606*b* for plane 1 604*b* of memory die 602*a*, codeword 606*c* for plane 2 604*c* of memory die 602*a*, codeword 606*d* for plane 3 604*d* of memory die 602*a*, codeword 610*a* for plane 0 608*a* of memory die 602*b*, codeword 610*b* for plane 1 608*b* of memory die 602*b*, codeword 610*c* for plane 2 608*c* of memory die 602*b*, codeword 610*d* for plane 3 608*d* of memory die 602*b*, codeword 614*a* for plane 0 612*a* of memory die 602*c*, codeword 614*b* for plane 1 612*b* of memory die 602*c*, codeword 614*c* for plane 2 612*c* of memory die 602*c*, and codeword 618 for plane 616 of memory die 602*c*.

During operation, dynamicXOR parity data is generated for TUs 1 through 11 for each plane on each TLC memory die 1 (e.g., 602*a*) through N−1 (602*b*), and for planes 0 through 2 on TLC memory die N (602*c*), and the resulting dynamicXOR parity data is stored TU12 (e.g., 606*a*, 606*b*, 606*c*, 606*d*, 610*a*, 610*b*, 610*c*, 610*d*, 614*a*, 614*b*, 614*c*) of the respective blocks, which is used as a dynamicXOR parity codeword. The generation of dynamicXOR data for a given TLC block can be as follows: $TU12=TU1 \oplus TU2 \oplus TU3 \oplus TU4 \oplus TU5 \oplus TU6 \oplus TU7 \oplus TU8 \oplus TU9 \oplus TU10 \oplus TU11$.

RAIN parity data is generated for each plane on each TLC memory die 1 (e.g., 602*a*) through N−1 (602*b*), and for planes 0 through 2 on TLC memory die N (602*c*), where TUs having the same ordinal position across the different planes in the same wordline form a RAIN stripe, and the resulting RAIN parity data is stored in a TU in the same wordline on a RAIN parity plane (plane 616) and having the same ordinal position. For FIG. 6, this can be represented by the following: RAIN parity $TUi\_PlnM\_DieN=TUi\_Pln0\_Die1 \oplus \ldots \oplus TUi\_PlnM\_Die1 \ldots \oplus TUi\_Pln0\_DieN-1 \oplus \ldots \oplus TUi\_PlnM\_DieN-1 \oplus TUi\_Pln0\_DieN \oplus \ldots \oplus TUi\_PlnM-1\_DieN$, where i ranges from 1 through 12 and where M ranges from 0 to 3.

The resulting RAIN parity data for each of TUs 1 through 11 is respectively stored in TUs 1 through 11 on the designated RAIN parity plane (plane 616) of TLC memory die N (memory die 602*c*). In this way, TUs 1 through 11 of the designated RAIN parity plane (plane 616) of TLC memory die N (memory die 602*c*) serve as RAIN parity codewords.

According to various example embodiments, RAIN parity data is not generated for the dynamicXOR parity codewords (TU12s) of planes on each TLC memory die 1 (e.g., 602*a*) through N−1 (602*b*), and for planes 0 through 2 on TLC memory die N (602*c*). Rather, according to various example embodiments, dynamicXOR parity data is generated for TUs 1 through 11 on the designated RAIN parity plane (plane 616) of TLC memory die N (memory die 602*c*), and the resulting dynamicXOR parity data is stored in TU12 (codeword 618) of the designated RAIN parity plane (plane 616) of TLC memory die N (memory die 602*c*), which serves as a dynamicXOR parity codeword for the RAIN parity codewords on the designated RAIN parity plane (plane 616).

Though not illustrated with respect to FIG. 6, some example embodiments enable dynamicXOR protection to be applied to a select set of die (of the plurality of TLC memory die) that is less than all memory die of a memory device. In such instances, assuming the last memory die is memory die N (memory die 602*c*) is typically used to store the RAIN parity data (on its last plane for plane-level RAIN protection) and does not need dynamicXOR protection, then TU12 (codeword 618) of the RAIN parity plane will be formed by RAIN operation, but as the results of XORing the TU12 in planes only from the memory die where dynamicXOR protection is not applied. For example, where TLC memory die 2 and TLC memory die 3 of the plurality of TLC memory die are selected for dynamicXOR protection (and the remainder of TLC memory die are not), each TLC memory die where dynamicXOR protection is selectively applied (i.e., TLC memory die 2 and TLC memory die 3) will be excluded from the plane-level RAIN parity generation, as shown by the following: RAIN parity TUi_PlnM_DieN=TUi_Pln0_Die1⊕ . . . ⊕TUi_PlnM_Die1⊕TUi_Pln0_Die4⊕ . . . ⊕TUi_PlnM_Die4 . . . ⊕TUi_Pln0_DieN−1⊕ . . . ⊕TUi_PlnM_DieN−1⊕TUi_Pln0_DieN⊕ . . . ⊕ TUi_PlnM−1_DieN, where i ranges from 1 through 12 and where M ranges from 0 to 3. It should be noted that numbering of the memory die is relative and, for some example embodiments, the order of the memory die can be changed. For example, if an example embodiment wants to apply dynamicXOR protection on a selective number memory die, including the last memory die N, then the example embodiment can choose a different memory die where dynamicXOR is not applied to store the RAIN parity. For example, assume TLC memory die2 and TLC memory die N are selected for dynamicXOR protection, and TLC memory die N−1 can be used to store the plane-level RAIN parity data (instead of the TLC memory die N). In such an instance, the RAIN parity generation can be calculated by the following: RAIN parity TUi_PlnM_DieN=TUi_Pln0_Die1⊕ . . . ⊕ TUi_PlnM_Die1⊕TUi_Pln0_Die3⊕ . . . ⊕ TUi_PlnM_Die3 . . . ⊕TUi_Pln0_DieN−1⊕ . . . ⊕ TUi_PlnM_DieN−1, where i ranges from 1 through 12 and where M ranges from 0 to 3.

Figure 7:
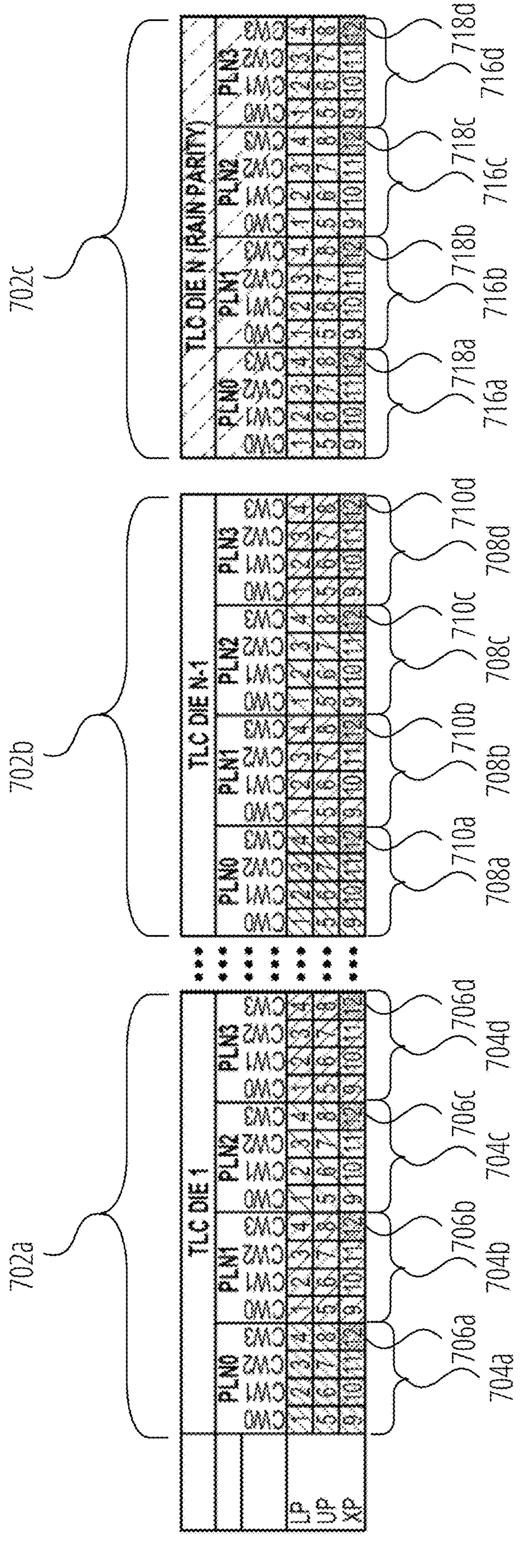
FIG. 7 illustrates an example of using dynamicXOR protection with die-level RAIN protection, in accordance with some example embodiments of the present disclosure.

FIG. 7 illustrates an example of using dynamicXOR protection with die-level RAIN protection, in accordance with some example embodiments of the present disclosure. In particular, FIG. 7 can represent an example implementation of method 300 of FIG. 3 with respect to die-level RAIN protection. According to some example embodiments, die-level RAIN protection protects against a single-die defectivity. The dynamicXOR protection can protect against page or codeword-level errors.

FIG. 7 illustrates a single wordline of a plurality of TLC memory die of a memory device (e.g., 140) of a memory system (e.g., memory sub-system 110)—TLC memory die 1 (702*a*) through TLC memory die N (memory die 702*c*). Each TLC memory die in FIG. 7 comprises four planes (planes 0 through 3), as represented by plane 0 704*a* through plane 3 704*d* for memory die 702*a*, plane 0 708*a* through plane 3 708*d* for memory die 702*b*, and plane 0 716*a* through plane 3 716*d* for memory die 702*c*. For a single wordline, each plane comprises three pages—a LP, a UP, and a XP. Each page (e.g., each LP, UP, and XP) comprises four codewords—codeword 0 (CW0) through codeword 3 (CW 3). The multiple pages in a single wordline on a single plane can form a block and, in FIG. 7 in particular, a TLC block given that the plane is on a TLC memory die. Each codeword in a single wordline on a single plane can be referred to as a translation unit (TU). Referring again to FIG. 7, as shown, the codewords within a single wordline on each plane on a TLC memory die can be referred to as TU1 through TU12-TU1 through TU4 for CW 0 through 3 in LP; TU5 through TU6 for CW 0 through 3 in UP; and TU9 through TU12 for CW 0 through 3 in XP.

According to various example embodiments, each plane of the TLC memory die 1 through N comprises a dynamicXOR parity codeword, as represented by codeword 706*a* for plane 0 704*a* of memory die 702*a*, codeword 706*b* for plane 1 704*b* of memory die 702*a*, codeword 706*c* for plane 2 704*c* of memory die 702*a*, codeword 706*d* for plane 3 704*d* of memory die 702*a*, codeword 710*a* for plane 0 708*a* of memory die 702*b*, codeword 710*b* for plane 1 708*b* of memory die 702*b*, codeword 710*c* for plane 2 708*c* of memory die 702*b*, codeword 710*d* for plane 3 708*d* of memory die 702*b*, codeword 718*a* for plane 0 716*a* of memory die 702*c*, codeword 718*b* for plane 1 716*b* of memory die 702*c*, codeword 718*c* for plane 2 716*c* of memory die 702*c*, and codeword 718*d* for plane 3 716*d* of memory die 702*c*.

During operation, dynamicXOR parity data is generated for TUs 1 through 11 for each plane on each TLC memory die 1 (e.g., 702*a*) through N−1 (702*b*), and the resulting dynamicXOR parity data is stored TU12 (e.g., 706*a*, 706*b*, 706*c*, 706*d*, 710*a*, 710*b*, 710*c*, 710*d*) of the respective blocks, which is used as a dynamicXOR parity codeword. The generation of dynamicXOR data for a given TLC block can be as follows: TU12=TU1⊕TU2⊕TU3⊕TU4⊕TU5⊕TU6⊕TU7⊕TU8⊕TU9⊕TU10⊕TU11.

RAIN parity data is generated for each plane on each TLC memory die 1 (e.g., 702*a*) through N−1 (702*b*), where TUs having the same ordinal position across the same ordinal plane in the same wordline form a RAIN stripe, and the resulting RAIN parity data is stored in a TU having the same ordinal position on a corresponding plane (corresponding RAIN parity plane) on TLC memory die N (memory die 702*c*), which serves as a designated RAIN parity memory die. For FIG. 7, this can be represented by the following: RAIN parity TUi_Plnj_DieN=TUi_Plnj_Die1⊕ . . . ⊕ TUi_Plnj_DieN−1, where i ranges from 1 through 11 and where M ranges from 0 to 3. The resulting RAIN parity data for each of TUs 1 through 11 is respectively stored in TUs 1 through 11 on the corresponding plane (corresponding RAIN parity plane) of TLC memory die N (memory die

702*c*). In this way, TUs 1 through 11 on the designated RAIN parity memory die (702*c*) serve as RAIN parity codewords.

According to various example embodiments, RAIN parity data is not generated for the dynamicXOR parity codewords (TU12s) of planes on each TLC memory die 1 (e.g., 702*a*) through N−1 (702*b*). Rather, according to various example embodiments, dynamicXOR parity data is generated for TUs 1 through 11 on each plane of planes 716*a*, 716*b*, 716*c*, 716*d* of the designated RAIN parity memory die (memory die 602*c*), and the resulting dynamicXOR parity data is stored in TU12 of each respective plane (codewords codeword 718*a*, 718*b*, 718*c*, 718*d*), which serves as a dynamicXOR parity codeword for those designated RAIN parity planes.

Though not illustrated with respect to FIG. 7, some example embodiments enable dynamicXOR protection to be applied to a select set of die (of the plurality of TLC memory die) that is less than all memory die of a memory device. In such instances, assuming the last memory die is memory die N (memory die 602*c*) is typically used to store the RAIN parity data (on all its planes for die-level RAIN protection) and does not need dynamicXOR protection, then TU12 (codeword 618) of the RAIN parity plane will be formed by RAIN operation, but as the results of XORing the TU12 in memory die where dynamicXOR protection is not applied. For example, where TLC memory die 2 and TLC memory die 3 of the plurality of TLC memory die are selected for dynamicXOR protection (and the remainder of TLC memory die are not), each TLC memory die where dynamicXOR protection is selectively applied (i.e., TLC memory die 2 and TLC memory die 3) will be excluded from the die-level RAIN parity generation, as shown by the following: RAIN parity TUi_Plnj_DieN=TUi_Plnj_Die1⊕TUi_Plnj_Die3⊕ . . . ⊕ TUi_Plnj_DieN−1, where i ranges from 1 through 11 and where M ranges from 0 to 3. It should be noted that numbering of the memory die is relative and, for some example embodiments, the order of the memory die can be changed. For example, if an example embodiment wants to apply dynamicXOR protection on a selective number memory die, including the last memory die N, then the example embodiment can choose a different memory die where dynamicXOR is not applied to store the RAIN parity. For example, assume TLC memory die2 and TLC memory die N are selected for dynamicXOR protection, and TLC memory die N−1 can be used to store the die-level RAIN parity data (instead of the TLC memory die N). In such an instance, the RAIN parity generation can be calculated by the following: RAIN parity TUi_Plnj_DieN=TUi_Plnj_Die1⊕TUi_Plnj_Die3⊕ . . . ⊕ TUi_Plnj_DieN−2, where i ranges from 1 through 11 and where M ranges from 0 to 3.

Figure 8:
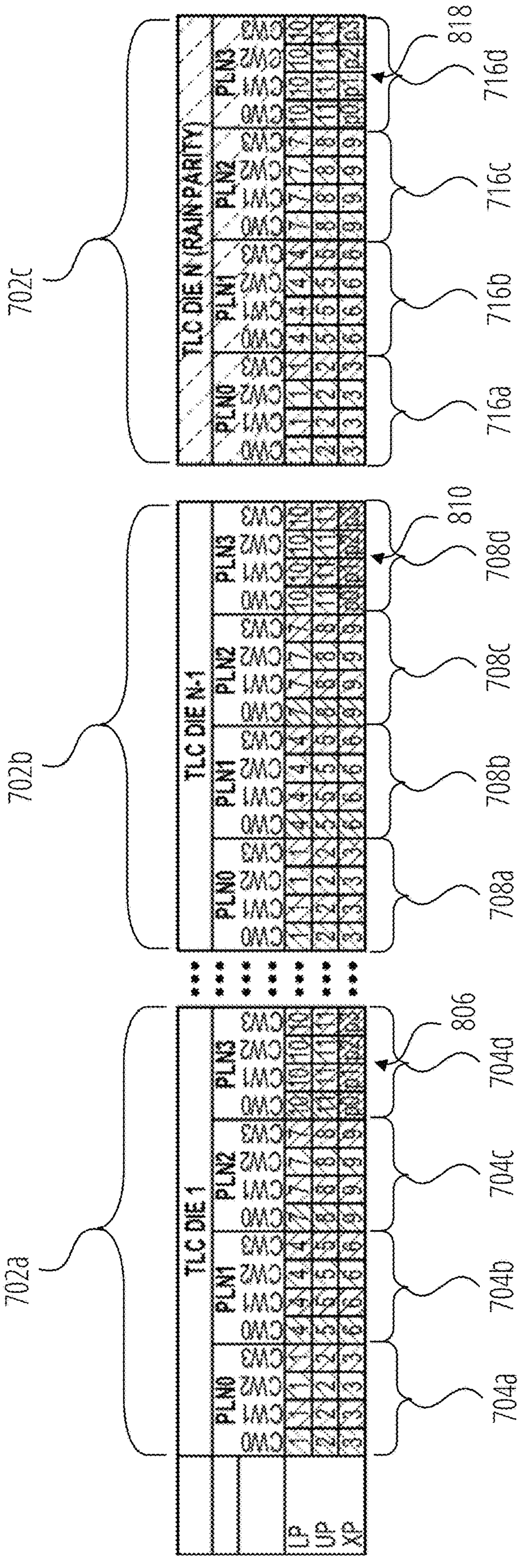
FIG. 8 illustrates an example of using dynamicXOR protection with die-level RAIN protection that supports larger input/output operations, in accordance with some example embodiments of the present disclosure.

FIG. 8 illustrates an example of using dynamicXOR protection with die-level RAIN protection that supports larger I/O operations, in accordance with some example embodiments of the present disclosure. In particular, FIG. 8 can represent an example implementation of method 400 of FIG. 4 with respect to die-level RAIN protection.

In particular, FIG. 8 represents a variation of FIG. 7 that supports larger I/O operations. In FIG. 8, the codewords having a same ordinal position within pages (e.g., LP, UP, XP) of a single TLC memory can be referred to as TU1 through TU12-TU1 through TU3 for CWp of plane 0 of TLC memory die 1; TU4 through TU6 for CWp of plane 1 of TLC memory die 1; TU7 through TU9 for CWp of plane 2 of TLC memory die 1; and TU10 through TU12 for CWp of plane 3 of TLC memory die 1 (where p ranges from 0 through 3).

According to various example embodiments, each of the TLC memory die 1 (memory die 702*a*) through N−1 (memory die 702*b*) comprises a set of dynamicXOR parity codeword. For some example embodiments, the set of dynamicXOR parity codewords protecting a given memory die (one of TLC memory die 1 through N−1) comprises TUs (e.g., p1, p2, p3, p4) in a last page (XP) of a last plane (plane 3) of the given memory die. This is represented by a set of codewords 806 for memory die 702*a* and a set of codewords 810 for memory die 702*b*.

During operation, dynamicXOR parity data is generated for TUs 1 through 11 for each of the TLC memory die 1 (memory die 702*a*) through N−1 (memory die 702*b*), and the resulting dynamicXOR parity data is stored TU12s (p0, p1, p2, p3) in a XP page on plane 3 of the respective memory die, which are used dynamicXOR parity codewords (which form the set of dynamicXOR parity codewords of the memory die). As described herein, the generation of dynamicXOR data for a given TLC block can be as follows: TU12=TU1⊕TU2⊕TU3⊕TU4⊕TU5⊕TU6⊕TU7⊕TU8⊕TU9⊕TU10⊕TU11.

RAIN parity data is generated for each of TLC memory die 1 (e.g., 702*a*) through N−1 (702*b*), where TUs having the same ordinal position across the same ordinal plane in the same wordline form a RAIN stripe, and the resulting RAIN parity data is stored in a TU having the same ordinal position on a corresponding plane (corresponding RAIN parity plane) on TLC memory die N (memory die 702*c*), which serves as a designated RAIN parity memory die. For FIG. 8, this can be represented by the following: RAIN parity TUi_Plnj_DieN=TUi_Plnj_Die1⊕ . . . ⊕TUi_Plnj_DieN−1, where i ranges from 1 through 12 (unlike FIG. 7) and where M ranges from 0 to 3. The resulting RAIN parity data for each of TUs 1 through 12 (unlike FIG. 7) is respectively stored in TUs 1 through 12 (unlike FIG. 7) on the corresponding plane (corresponding RAIN parity plane) of TLC memory die N (memory die 702*c*). In this way, TUs 1 through 12 on the designated RAIN parity memory die (702*c*) serve as RAIN parity codewords.

Unlike FIG. 7, in FIG. 8, dynamicXOR parity codewords of TLC memory die 1 (702*a*) through N−1 (702*b*) are not skipped for RAIN parity data generation, in accordance with various example embodiments. Additionally, unlike FIG. 7, in FIG. 8, dynamicXOR parity data generation is not performed with respect to the TLC memory die N (702*c*), in accordance with various example embodiments. According to some example embodiments, a set of codewords 818 (set of RAIN parity codewords) stored RAIN parity data generated for TU12s of TLC memory die 1 (702*a*) through N−1 (702*b*) and stored in TU12s of TLC memory die N (702*c*) can serve as dynamicXOR parity data (without need for the data being generated by dynamicXOR operations).

Figure 9:
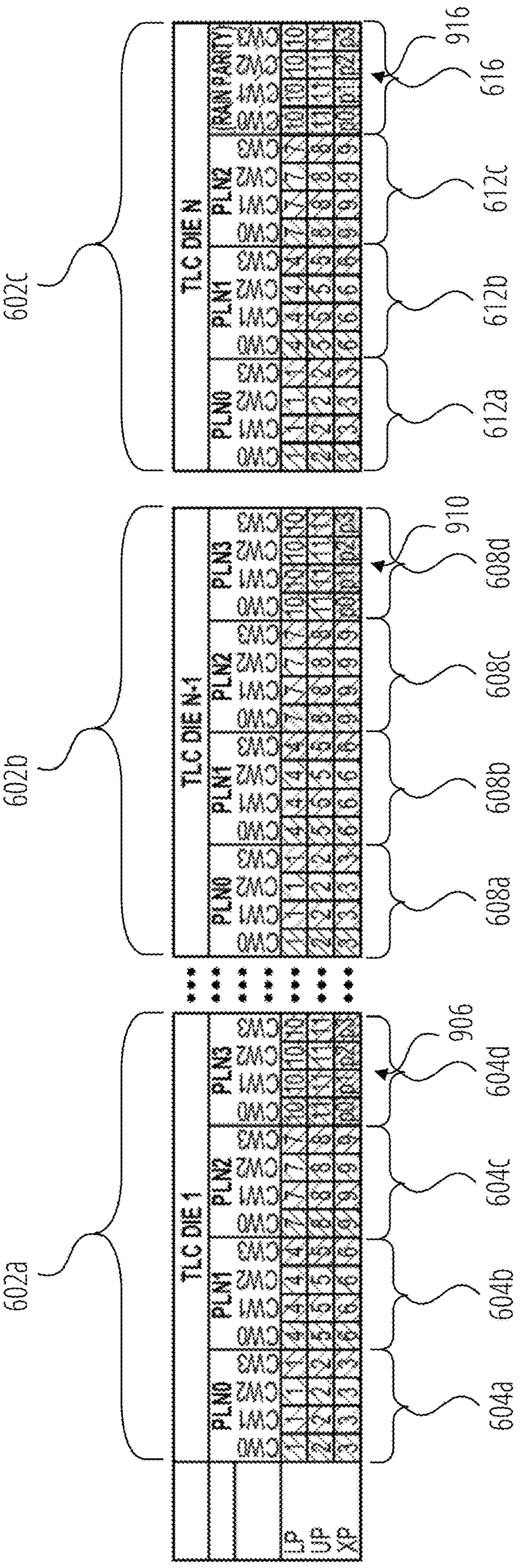
FIG. 9 illustrates an example of using dynamicXOR protection with plane-level RAIN protection that supports larger I/O operations, in accordance with some example embodiments of the present disclosure.

FIG. 9 illustrates an example of using dynamicXOR protection with plane-level RAIN protection that supports larger I/O operations, in accordance with some example embodiments of the present disclosure. In particular, FIG. 9 can represent an example implementation of method 500 of FIG. 5 with respect to plane-level RAIN protection.

In particular, FIG. 9 represents a variation of FIG. 6 that supports larger I/O operations. In FIG. 9, the codewords having a same ordinal position within pages (e.g., LP, UP, XP) of a single TLC memory can be referred to as TU1 through TU12-TU1 through TU3 for CWp of plane 0 of TLC memory die 1; TU4 through TU6 for CWp of plane 1 of TLC memory die 1; TU7 through TU9 for CWp of plane 2 of TLC memory die 1; and TU10 through TU12 for CWp of plane 3 of TLC memory die 1 (where p ranges from 0 through 3).

According to various example embodiments, each of the TLC memory die 1 (memory die memory dies 602*a*) through N−1 (memory die 602*b*) comprises a set of dynamicXOR parity codeword. For some example embodiments, the set of dynamicXOR parity codewords protecting a given memory die (one of TLC memory die 1 through N−1) comprises TUs (e.g., p1, p2, p3, p4) in a last page (XP) of a last plane (plane 3) of the given memory die. This is represented by a set of codewords 906 for memory die memory dies 602*a* and a set of codewords 910 for memory die 602*b*.

During operation, dynamicXOR parity data is generated for TUs 1 through 11 for each of the TLC memory die 1 (memory die 602*a*) through N−1 (memory die 602*b*), and the resulting dynamicXOR parity data is stored TU12s (p0, p1, p2, p3) in a XP page on plane 3 of the respective memory die, which are used dynamicXOR parity codewords (which form the set of dynamicXOR parity codewords of the memory die). As described herein, the generation of dynamicXOR data for a given TLC block can be as follows: TU12=TU1⊕TU2⊕TU3⊕TU4⊕TU5⊕TU6⊕TU7⊕TU8⊕TU9⊕TU10⊕TU11. For various example embodiments, dynamicXOR parity data is not explicitly generated for TLC memory die N (memory die 602*c*). Rather, in accordance with various example embodiments, dynamicXOR parity data is implicitly generated for TLC memory die N (memory die 602*c*) when RAIN parity data is generated for TU12 for each of the TLC memory die 1 (memory die 602*a*) through N−1 (memory die 602*b*), as described herein.

RAIN parity data is generated for each of TLC memory die 1 (e.g., 702*a*) through N−1 (702*b*), where TUs having the same ordinal position across the same ordinal plane in the same wordline form a RAIN stripe, and the resulting RAIN parity data is stored in a TU having the same ordinal position on a corresponding plane (corresponding RAIN parity plane) on TLC memory die N (memory die 702*c*), which serves as a designated RAIN parity memory die. For FIG. 9, this can be represented by the following: RAIN parity TUi_PlnM_DieN=TUi_Pln0_Die1 ⊕ . . . ⊕ TUi_PlnM_Die1 . . . ⊕TUi_Pln0_DieN−1⊕ . . . ⊕TUi_PlnM_DieN−1⊕TUi_Pln0_DieN ⊕ . . . ⊕ TUi_PlnM−1_DieN, where i ranges from 1 through 12 (unlike FIG. 6) and where M ranges from 0 to 3. The resulting RAIN parity data for each of TUs 1 through 12 (unlike FIG. 6) is respectively stored in TUs 1 through 12 (unlike FIG. 6) on TLC memory die N (memory die 602*c*). In this way, TUs 1 through 12 on the designated RAIN parity memory die (602*c*) serve as RAIN parity codewords.

Unlike FIG. 6, in FIG. 9, dynamicXOR parity codewords of TLC memory die 1 (602*a*) through N−1 (602*b*) are not skipped for RAIN parity data generation, in accordance with various example embodiments. Additionally, unlike FIG. 6, in FIG. 9, dynamicXOR parity data generation is not performed with respect to the TLC memory die N (602*c*), in accordance with various example embodiments. According to some example embodiments, a set of codewords 916 (set of RAIN parity codewords) stored RAIN parity data generated for TU12s of TLC memory die 1 (602*a*) through N−1 (602*b*) and stored in TU12s of TLC memory die N (602*c*) can serve as dynamicXOR parity data (without need for the data being generated by dynamicXOR operations).

Figure 10:
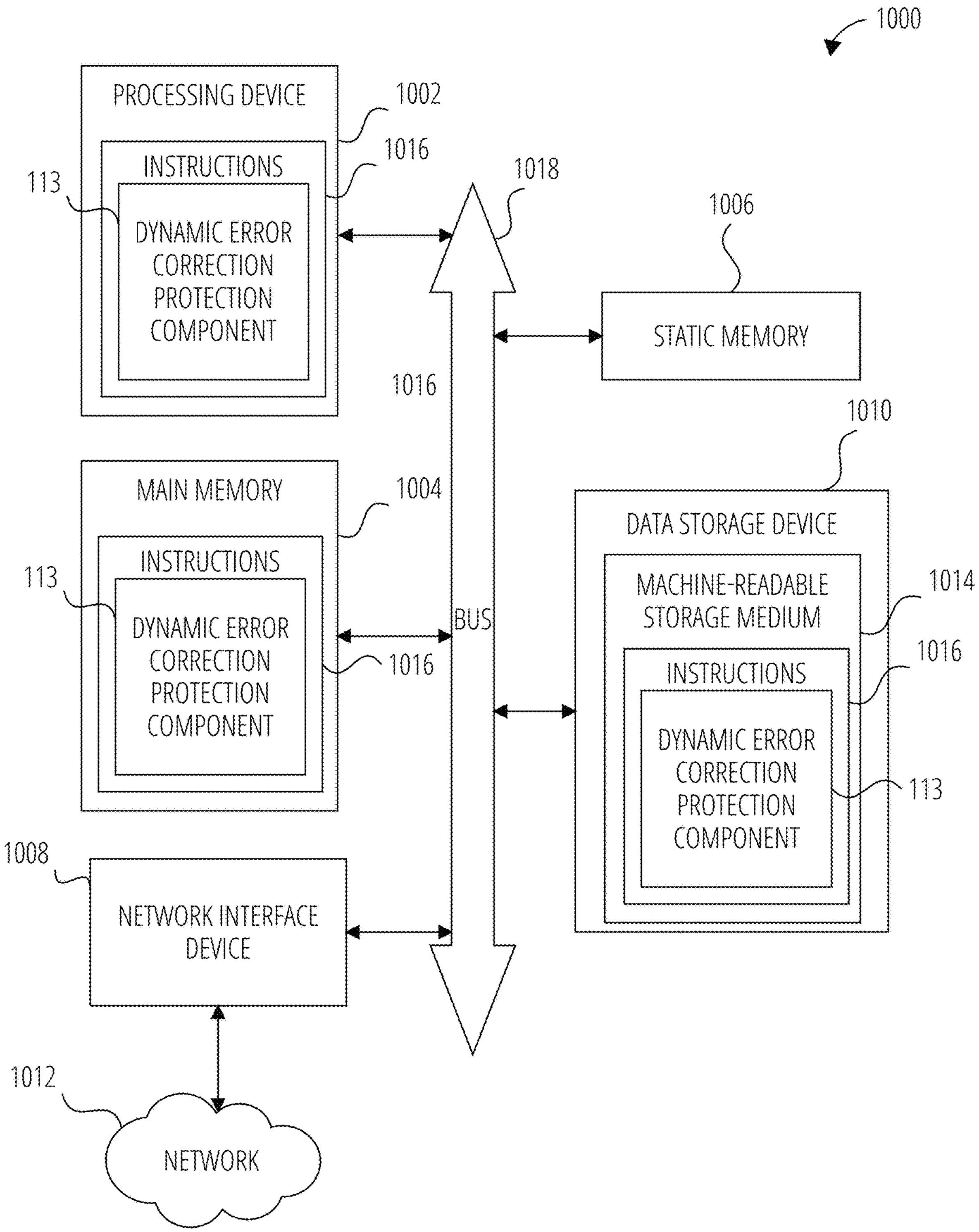
FIG. 10 is a diagram of an example computer system in which example embodiments of the present disclosure may operate.

FIG. 10 illustrates an example machine in the form of a computer system 1000 within which a set of instructions can be executed for causing the machine to perform any one or more of the methodologies discussed herein. In some example embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative example embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term “machine” shall also be taken to include any collection of machines that individually or jointly execute a set (or multiple sets) of instructions to perform any one or more of the methodologies discussed herein.

The example computer system 1000 includes a processing device 1002, a main memory 1004 (e.g., ROM, flash memory, DRAM such as SDRAM or Rambus DRAM (RDRAM), etc.), a static memory 1006 (e.g., flash memory, static random access memory (SRAM), etc.), and a data storage device 1010, which communicate with each other via a bus 1018.

The processing device 1002 represents one or more general-purpose processing devices such as a microprocessor, a central processing unit, or the like. More particularly, the processing device 1002 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1002 can also be one or more special-purpose processing devices such as an application-specific integrated circuit (ASIC), a field programmable gate array (FPGA), a digital signal processor (DSP), a network processor, or the like. The processing device 1002 is configured to execute instructions 1016 for performing the operations and steps discussed herein. The computer system 1000 can further include a network interface device 1008 to communicate over a network 1012.

The data storage device 1010 can include a machine-readable storage medium 1014 (also known as a computer-readable medium) on which is stored one or more sets of instructions 1016 or software embodying any one or more of the methodologies or functions described herein. The instructions 1016 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1014, data storage device 1010, and/or main memory 1004 can correspond to the memory sub-system 110 of FIG. 1.

In one example embodiment, the instructions 1016 include instructions to implement functionality corresponding to providing dynamic error correction protection with RAIN protection for a memory system (e.g., memory sub-system) as described herein (e.g., the dynamic error correction protection component 113 of FIG. 1). While the machine-readable storage medium 1014 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1 is a system comprising: a memory device; and a processing device, operatively coupled to the memory device, configured to perform operations comprising: storing host data across non-parity codewords of a select wordline across a plurality of planes of the memory device; for an individual plane of the plurality of planes: generating select dynamic exclusively OR (dynamicXOR) parity data for a portion of the host data stored across non-parity codewords in the select wordline on the individual plane; and storing the select dynamicXOR parity data in a dynamicXOR parity codeword of the select wordline on the individual plane; generating select redundant array of independent NAND-type memory devices (RAIN) parity data for non-parity codewords of the select wordline across the plurality of planes while excluding use of dynamicXOR parity codewords of the select wordline in the generating of the select RAIN parity data; storing the select RAIN parity data across non-parity codewords of the select wordline on a designated RAIN parity plane of the memory device; generating additional dynamicXOR parity data for the select RAIN parity data stored across RAIN parity codewords in the select wordline on the designated RAIN parity plane; and storing the additional dynamicXOR parity data in a dynamicXOR parity codeword of the select wordline on the designated RAIN parity plane.

In Example 2, the subject matter of Example 1 includes, wherein the dynamicXOR parity codeword of the select wordline on the individual plane is a last codeword of a last page of the select wordline on the individual plane.

In Example 3, the subject matter of Examples 1-2 includes, wherein each page comprises four codewords.

In Example 4, the subject matter of Examples 1-3 includes, wherein the plurality of planes comprises planes across one or more memory die of the memory device, wherein each memory die comprises triple-level cells (TLCs), and wherein the select wordline on each plane comprises a lower page (LP), an upper page (UP), and an extra page (XP).

In Example 5, the subject matter of Examples 1-4 includes, wherein the plurality of planes comprises planes across one or more memory die of the memory device, wherein each memory die comprises quad-level cells (QLCs), and wherein the select wordline on each plane comprises a lower page (LP), an upper page (UP), an extra page (XP), and top page (TP).

In Example 6, the subject matter of Examples 1-5 includes, wherein the generating of the select dynamicXOR parity data for the portion of the host data stored across the non-parity codewords in the select wordline on the individual plane comprises: exclusive OR-ing (XORing) together the non-parity codewords in the select wordline on the individual plane to generate the select dynamicXOR parity data.

In Example 7, the subject matter of Examples 1-6 includes, where the generating of the select RAIN parity data for non-parity codewords of the select wordline across the plurality of planes while excluding dynamicXOR parity codewords of the select wordline comprises: generating RAIN parity data for Nth non-parity codewords of the select wordline across the plurality of planes based on a Nth non-parity codeword of the select wordline on each plane of the plurality of planes, the storing of the select RAIN parity data across non-parity codewords of the select wordline on the designated RAIN parity plane of the memory device comprising: storing the RAIN parity data for the Nth non-parity codewords in a Nth non-parity codeword of the select wordline on the designated RAIN parity plane.

In Example 8, the subject matter of Examples 1-7 includes, wherein the memory device comprises a plurality of non-parity memory die and a parity memory die, wherein the plurality of planes is a Mth plurality of non-parity memory die that comprises a Mth plane of each non-parity memory die of the plurality of non-parity memory die, and wherein the designated RAIN parity plane is a Mth plane of the parity memory die.

In Example 9, the subject matter of Examples 1-8 includes,)th plane across a first memory die through a Nth memory die of the memory device, wherein the designated RAIN parity plane is a Mth plane, and wherein the Mth plane is part of the Nth memory die.

Example 10 is a method to implement any of Examples 1-9.

Example 11 is at least one machine-readable medium comprising instructions that, when executed by a processing device, cause the processing device to perform operations to implement any of Examples 1-9.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (such as a non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some example embodiments, a machine-readable (e.g., computer-readable) medium includes a machine (e.g., a computer) readable storage medium such as a ROM, RAM, magnetic disk storage media, optical storage media, flash memory components, and so forth. A machine-readable storage medium can be non-transitory (in other words, not having any transitory signals) in that it does not embody a propagating signal. However, labeling a machine-readable storage medium "non-transitory" should not be construed to mean that the machine-readable storage medium is incapable of movement; the machine-readable storage medium should be considered as being transportable from one physical location to another.

In the foregoing specification, example embodiments of the disclosure have been described with reference to specific example embodiments thereof. It will be evident that various modifications can be made thereto without departing from the broader spirit and scope of example embodiments of the disclosure as set forth in the following claims. The specification and drawings are, accordingly, to be regarded in an illustrative sense rather than a restrictive sense.

The invention claimed is:

1. A system comprising:
- a memory device; and
- a processing device, operatively coupled to the memory device, configured to perform operations comprising:
  - storing host data across non-parity codewords of a select wordline across a plurality of planes of the memory device;
  - for an individual plane of the plurality of planes:
    - generating select dynamic exclusively OR (dynamicXOR) parity data for a portion of the host data stored across non-parity codewords in the select wordline on the individual plane; and
    - storing the select dynamicXOR parity data in a dynamicXOR parity codeword of the select wordline on the individual plane;
  - generating select redundant array of independent NAND-type memory devices (RAIN) parity data for non-parity codewords of the select wordline across the plurality of planes while excluding use of dynamicXOR parity codewords of the select wordline in the generating of the select RAIN parity data;
  - storing the select RAIN parity data across non-parity codewords of the select wordline on a designated RAIN parity plane of the memory device;
  - generating additional dynamicXOR parity data for the select RAIN parity data stored across RAIN parity codewords in the select wordline on the designated RAIN parity plane; and
  - storing the additional dynamicXOR parity data in a dynamicXOR parity codeword of the select wordline on the designated RAIN parity plane.

2. The system of claim 1, wherein the dynamicXOR parity codeword of the select wordline on the individual plane is a last codeword of a last page of the select wordline on the individual plane.

3. The system of claim 1, wherein each page comprises four codewords.

4. The system of claim 1, wherein the plurality of planes comprises planes across one or more memory die of the memory device, wherein each memory die comprises triple-level cells (TLCs), and wherein the select wordline on each plane comprises a lower page (LP), an upper page (UP), and an extra page (XP).

5. The system of claim 1, wherein the plurality of planes comprises planes across one or more memory die of the memory device, wherein each memory die comprises quad-level cells (QLCs), and wherein the select wordline on each plane comprises a lower page (LP), an upper page (UP), an extra page (XP), and top page (TP).

6. The system of claim 1, wherein the generating of the select dynamicXOR parity data for the portion of the host data stored across the non-parity codewords in the select wordline on the individual plane comprises:
- exclusive OR-ing (XORing) together the non-parity codewords in the select wordline on the individual plane to generate the select dynamicXOR parity data.

7. The system of claim 1, where the generating of the select RAIN parity data for non-parity codewords of the select wordline across the plurality of planes while excluding dynamicXOR parity codewords of the select wordline comprises:
- generating RAIN parity data for Nth non-parity codewords of the select wordline across the plurality of planes based on a Nth non-parity codeword of the select wordline on each plane of the plurality of planes,
- the storing of the select RAIN parity data across non-parity codewords of the select wordline on the designated RAIN parity plane of the memory device comprising:
  - storing the RAIN parity data for the Nth non-parity codewords in a Nth non-parity codeword of the select wordline on the designated RAIN parity plane.

8. The system of claim 1, wherein the memory device comprises a plurality of non-parity memory die and a parity memory die, wherein the plurality of planes is a Mth plurality of non-parity memory die that comprises a Mth plane of each non-parity memory die of the plurality of non-parity memory die, and wherein the designated RAIN parity plane is a Mth plane of the parity memory die.

9. The system of claim 1, wherein the plurality of planes comprises a first plane through a (M−1)th plane across a first memory die through a Nth memory die of the memory device, wherein the designated RAIN parity plane is a Mth plane, and wherein the Mth plane is part of the Nth memory die.

10. At least one non-transitory machine-readable storage medium comprising instructions that, when executed by a processing device, cause the processing device to perform operations comprising:

storing host data across non-parity codewords of a select wordline across planes of a plurality of non-parity memory die of a memory device;

for an individual memory die of the plurality of non-parity memory die:

generating select dynamic exclusively OR (dynamicXOR) parity data for a portion of the host data stored across non-parity codewords in the select wordline on the individual memory die; and storing the select dynamicXOR parity data in a set of dynamicXOR parity codewords of the select wordline on the individual memory die;

generating Mth redundant array of independent NAND-type memory devices (RAIN) parity data for codewords of the select wordline on a Mth plane of each non-parity memory die of the plurality of non-parity memory die; and storing the Mth RAIN parity data across codewords of the select wordline on a Mth plane of a parity memory die of the memory device.

11. The at least one non-transitory machine-readable storage medium of claim 10, wherein the set of dynamicXOR parity codewords on the individual memory die comprises a set of codewords on a last plane of the individual memory die.

12. The at least one non-transitory machine-readable storage medium of claim 10, wherein the set of dynamicXOR parity codewords on the individual memory die comprises a set of codewords of a last page of a last plane of the individual memory die.

13. The at least one non-transitory machine-readable storage medium of claim 10, wherein the select wordline comprises multiple pages, and wherein each page comprises four codewords.

14. The at least one non-transitory machine-readable storage medium of claim 10, wherein the generating of the select dynamicXOR parity data for the portion of the host data stored across the non-parity codewords in the select wordline on the individual memory die comprises:

exclusive OR-ing (XORing) together the non-parity codewords in the select wordline on the individual memory die to generate the select dynamicXOR parity data.

15. The at least one non-transitory machine-readable storage medium of claim 10, wherein the operations comprise:

generating (M+1)th RAIN parity data for codewords of the select wordline on a (M+1)th plane of each non-parity memory die of the plurality of non-parity memory die; and storing the (M+1)th RAIN parity data across codewords of the select wordline on a (M+1)th plane of the parity memory die.

16. The at least one non-transitory machine-readable storage medium of claim 10, wherein the set of dynamicXOR parity codewords on the individual memory die comprises a set of codewords on a last plane of the individual memory die, and wherein the operations comprise:

generating select RAIN parity data for codewords of the select wordline on the last plane of each non-parity memory die of the plurality of non-parity memory die; and storing the select RAIN parity data across codewords of the select wordline on a last plane of the parity memory die.

17. A method comprising:

storing host data across non-parity codewords of a select wordline across a plurality of planes of a plurality of memory die of a memory device, the plurality of memory die comprises a first memory die through Nth memory die;

for an individual memory die of the first memory die through a (N−1)th memory die of the plurality of memory die:

generating select dynamic exclusively OR (dynamicXOR) parity data for a portion of the host data stored across non-parity codewords in the select wordline on the individual memory die; and storing the select dynamicXOR parity data in a set of dynamicXOR parity codewords of the select wordline on the individual memory die;

generating select redundant array of independent NAND-type memory devices (RAIN) parity data for codewords of the select wordline across the plurality of planes including dynamicXOR parity codewords of the select wordline; and storing the select RAIN parity data across codewords of the select wordline on a designated RAIN parity plane of the Nth memory die.

18. The method of claim 17, wherein the set of dynamicXOR parity codewords on the individual memory die comprises a set of codewords of a last page of a last plane of the individual memory die.

19. The method of claim 17, wherein the generating of the select dynamicXOR parity data for the portion of the host data stored across the non-parity codewords in the select wordline on the individual memory die comprises:

exclusive OR-ing (XORing) together the non-parity codewords in the select wordline on the individual memory die to generate the select dynamicXOR parity data.

20. The method of claim 17, wherein the plurality of planes comprises a first plane through a (M−1)th plane, wherein the designated RAIN parity plane is a Mth plane, and wherein the Mth plane is part of the Nth memory die.

* * * * *